US006999945B1

(12) United States Patent
Freeny, Jr.

(10) Patent No.: US 6,999,945 B1
(45) Date of Patent: *Feb. 14, 2006

(54) MULTIPLE CUSTOMER AND MULTIPLE LOCATION PC SERVICE PROVIDER SYSTEM

(75) Inventor: Charles C. Freeny, Jr., Grand Prairie, TX (US)

(73) Assignee: Automated Business Companies, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,598

(22) Filed: Sep. 30, 1999

Related U.S. Application Data

(63) Continuation-in-part of application No. 09/014,859, filed on Jan. 29, 1998, now Pat. No. 6,243,743.

(60) Provisional application No. 60/102,618, filed on Oct. 1, 1998.

(51) Int. Cl.
*G06F 15/16* (2006.01)
*G06F 16/00* (2006.01)

(52) U.S. Cl. .............................. 705/50; 705/50; 705/1; 709/217; 709/204; 709/250

(58) Field of Classification Search ................ 709/200, 709/202, 201, 203, 204, 217, 250; 705/1, 705/50–59; 348/460, 723, 8, 13; 345/161, 345/327, 6, 10, 158, 156

See application file for complete search history.

(56) References Cited

U.S. PATENT DOCUMENTS

| 5,210,825 A | | 5/1993 | Kavaler |
| 5,418,919 A | * | 5/1995 | Kadosawa et al. .......... 712/203 |
| 5,642,515 A | | 6/1997 | Jones et al. |
| 5,696,901 A | * | 12/1997 | Konrad ........................ 709/203 |
| 5,771,354 A | * | 6/1998 | Crawford ..................... 709/229 |
| 5,805,806 A | | 9/1998 | McArthur .................... 709/250 |
| 5,812,930 A | * | 9/1998 | Zavrel .......................... 725/62 |
| 5,832,223 A | | 11/1998 | Hara et al. ................... 725/114 |

(Continued)

FOREIGN PATENT DOCUMENTS

WO    9728623    8/1997

(Continued)

OTHER PUBLICATIONS

Wood, Kenneth R., Global Teleporting with JAVA; Toward Ubiquitous Personalized Computing (IEEE Feb. 1997).*

(Continued)

*Primary Examiner*—James P. Trammell
*Assistant Examiner*—Cristina Sherr
(74) *Attorney, Agent, or Firm*—Dunlap, Codding & Rogers, P.C.

(57) ABSTRACT

The present invention contemplates a system whereby a service provider can service a large number of customers (millions) and connect them to their rented PC from millions of locations around the world. Many customers (10 to 100 thousand) can be connected simultaneously. The service provider is responsible for maintaining the latest PC Hardware and Software configurations available on the market instead of the customer. The rented PC operates in essentially the same manner as if one purchased and maintained their PC at home or office. Access to the individuals rented PC can be obtained from any existing PC, office network computer, a Web TV computer or other customer interface computer which has been authorized by the service provider. The current invention will greatly improve existing Client/Server systems being used to service large global offices. However The greatest improvement, is to make the PC much more convenient and easier for the individual to use in the future and shift the PC hardware and software update burden to the service provider.

5 Claims, 6 Drawing Sheets

U.S. PATENT DOCUMENTS

| | | | |
|---|---|---|---|
| 5,835,717 A | 11/1998 | Karlton et al. ................ 725/46 |
| 5,845,282 A | 12/1998 | Alley et al. | |
| 5,850,265 A | 12/1998 | Suh ............................ 725/110 |
| 5,850,340 A | 12/1998 | York | |
| 5,852,437 A | 12/1998 | Wugofski et al. | |
| 5,852,713 A * | 12/1998 | Shannon ........................ 714/6 |
| 5,857,142 A | 1/1999 | Lin et al. ...................... 725/73 |
| 5,889,845 A * | 3/1999 | Staples et al. ......... 379/211.02 |
| 5,898,419 A | 4/1999 | Liu | |
| 5,933,597 A | 8/1999 | Hogan | |
| 5,940,074 A * | 8/1999 | Britt et al. .................. 714/749 |
| 5,940,387 A * | 8/1999 | Humpleman ................ 370/352 |
| 5,961,586 A | 10/1999 | Pedersen .................... 709/201 |
| 5,974,444 A | 10/1999 | Konrad ....................... 709/203 |
| 5,982,363 A * | 11/1999 | Naiff .......................... 715/721 |
| 5,991,735 A * | 11/1999 | Gerace ....................... 705/10 |
| 6,049,831 A | 4/2000 | Gardell et al. | |
| 6,115,736 A | 9/2000 | Devarakonda et al. | |
| 6,122,674 A | 9/2000 | Olnowich | |
| 6,138,150 A | 10/2000 | Nichols et al. | |
| 6,166,734 A * | 12/2000 | Nahi et al. .................. 345/748 |
| 6,167,441 A * | 12/2000 | Himmel ...................... 709/217 |
| 6,181,326 B1 * | 1/2001 | Takahashi ................... 345/158 |
| 6,233,608 B1 * | 5/2001 | Laursen et al. ............. 709/217 |
| 6,243,743 B1 * | 6/2001 | Freeny ....................... 709/217 |
| 6,259,443 B1 * | 7/2001 | Williams, Jr. ............... 345/741 |
| 6,263,346 B1 * | 7/2001 | Rodriquez ................. 707/201 |
| 6,351,771 B1 * | 2/2002 | Craddock et al. ........... 709/227 |
| 6,359,892 B1 * | 3/2002 | Szlam ........................ 370/401 |
| 6,360,253 B1 * | 3/2002 | Freeny ....................... 709/217 |
| 6,453,334 B1 | 9/2002 | Vinson et al. | |
| 6,463,459 B1 * | 10/2002 | Orr et al. .................... 709/203 |
| 6,728,786 B2 | 4/2004 | Hawkins et al. | |

FOREIGN PATENT DOCUMENTS

| | | | |
|---|---|---|---|
| WO | WO 97/28623 | * | 8/1997 |
| WO | WO 98/35291 | * | 8/1998 |

OTHER PUBLICATIONS

"Good-Bye, GUI-HELLO NUI"; Byte, Jul. 1997; pp. 60-72.
"Part I—Cheaper Computing"; Byte, Apr. 1997, pp. 66-80.
"IBM Technical Disclosure Bulliten"; 700 IBM Technical Disclosure Bulletin; vol. 30, No. 12, May 1988, Armonk, NY USA; pp. 30-33.
Personal Interactive Computing Objects, Roy Want and Andy Hopper, Olivetti Research Ltd, 24a Trumpington Street, Cambridge CB2 1QA, England; Undated.
Piconet Embedded Mobile Networking, Frazer Bennett, David Clarke, Joseph B. Evans, Andy Hopper, Alan Jones, and David Leask; Undated, pp. 1-23.
Remoting Peripherals Using Memory-Mapped Networks, S.J. Hodges, S.L. Pope, D.E. Roberts, G.E. Mapp and A. Hopper, Undated, pp. 1-3.
SPIRIT: A Resource Database for Mobile Users, Noha Adly, Pete Steggles and Andy Harter; Computer Laborator, Cambridge University, Cambridge CB2 3QG, UK; Undated, pp. 1-10.
Design and Use of High-Speed Networks in Multimedia Applications, Andy Hopper, ORL-91-2; Published in Proceeding of 3rd IFIP Conference on High Speed Networking Berlin, Mar. 1991., pp. 1-14.
Teleporting—Making Applications Mobile, Frazer Bennett, Tristan Richardson, Andy Harter, Olivetti Research Laborator, Undated.

Supporting User Mobility, Martin G. Brown, Olivetti Research Ltd. 24a Trumpington St., Cambridge, CBI 1QA, UK; undated.
Teleporting, Mobile X Sessions, Tristan Richardson; Undated, pp. 1-8.
The Cambridge Fast Ring Networking System, Andrew Hopper and Roger M. Needham, ORL-88-1, Copyright © 1990 Olivetti Research Limited; vol. 37, No. 10, Oct. 1988.
The Implementation of a Distributed Framework to support 'Follow Me' Applications, Pete Steggles, Paul Webster and Andy Harter, The Olivetti and Oracle Research Laboratory, Undated.
A Framework to Integrate Synchronous and Asynchronous Collaboration, S.F. Li—Computer Laboratory, University of Cambridge and A. Hopper—Department of Engineering, undated.
Pandora: An Experiment in Distributed Multimedia, Tony King, ORL 92-5, To be published in the Proceedings of Eurographics '92, Sep. 1992.
Pandora—an experimental system for multimedia applications, Andy Hopper, ORL-90-1, Published in 'Operating Systems Review' Jan. 12, 1990; pp. 1-16.
A Distributed Location System for the Active Office, Andy Harter of Olivetti Research Limited and Andy Hopper of the University of Cambridge, UK; Nov. 1993.
Network Cards for the Pandora Multimedia System, DJ Clarke, Olivetti Research Limited and GJ Stark, Advanced Telecommunication Module Ltd., ORL Technical Report 94-5, pp. 1-14.
Mobile Computing with Python, James "Wez" Weatherall & David Scott, Laboratory for Communication Engineering, Cambridge, England, {inw22.djs55}@eng.cam.ac.uk; undated.
Teleporting in an X Window System Environment, Tristan Richardson, Frazer Bennett, Glenford Mapp, and Andy Hopper, Nov. 1993, pp, 1-14.
Digital Video on Computer Workstations, Andy Hopper, ORL 92-6, To be published in the Proceeding of Eurographics, Sep. 1992, pp. 1-14.
Automated Business Companies v. Citrix System, Inc., and Citrix Online, LLC, ANSWER of Citrix Systems, Inc., and Citrix Online, LLC; Civil Action No. H-05-0682, U.S. District Court for the Southern District of Texas Houston Division.
"NetOp Remote Control for Linux, Product Review, Aug. 11, 2003", www.linuxworld.com/story/33892.htm.
"NetOp gives Linux control of remote Windows desktops, Mar. 25, 2003, author: roblimo", http://networking.itmanagersjournal.com/article.pl?sid=03/10/12/162237.
"X" in Linux, May 18, 1998, Geoffey Bennett, www.apcmag.com/ape/v3.nsf/0/A50FAC1610EA551ECA256D44001AD78F.
"The wonders of X", Dec. 14, 2001, Ashton Mills, www.apcmag.com/apc/v3.nsf/0/0866C58D1276A3F9CA256D44001A750B.
"Linux Jun. 98", May 18, 1998, Geoffrey Bennett, www.apcmag.com/apc/v3.nsf/0/F5A8A0F2570C5E04CA256D4400206BAC.
"Linux on a laptop", Jun. 16, 1998, Geoffey Bennett, www.apcmag.com/apc/v3.nsf/0/4893C740DB353694CA256D44001AD798.
"Linux Dec. 97", Nov. 21, 1997, Geoffrey Bennett, www.apcmag.com/apc/v3.nsf/0/4D1C3A8DDA4DB8DDCA256D44002082CC.

"Windows onto linux" Dec. 19, 2001, Ashton Mills, www.apcmag.com/apc/v3.nsf/0/E16111E109E932A3CA256D44001A7486.

"Seven Penguin power plays", Jan. 21, 2003, APC staff, www.apcmag.com/apc/v3.nsf/0/60B4A8004FF9E3BBCA256D44001A488F.

"What is XFree86 ® Home to the X Window System", www.xfree86.org.

"The Current XFreeB6 ® Release, Xfree 86 Release 4.4.0", www.xfree86.org/releases/rel440.html.

"Documentation for XFree86[tm] version 4.4.0, The XFree86 Project, Inc., Feb. 29, 2004", www.xfree86.org/4.4.0.

"Downloading the XFree86 4.4.0 binaries", www.xfree86.org/4.4.0/Install2.html.

README for XFree86[tm]4.4.0., The Xfree 86 Project, Inc., www.xfree86.org/4.4.0/README.html.

"WinaXe: Linux Hand in Hand with Windows" Linux for You, Mar. 2003 edition.

University of Durham, Information Technology Service, InfoSheet 101, Version 1.0, "Setting up a remote X Window", 101XWindows.doc: Jan. 1999.

"Installing XFree86 4.4.0 using the Xinstall.sh script", www.xfree86.org/4.4.0/Install3.html.

"X-SecurePro Secure X-Server for Windows free download by Labtam Inc.: S . . . stem, TCP/IP, FTP, LPR, LPD, telnet client server, NFS, Now with unique" www.softpile.com/Utilities/Network/Download_09036_1.html.

Virtual Network Computing, Tristan Richardson, Quentin Stafford-Fraser, Kenneth R. Wood and Andy Hopper, IEEE Internet Computing, vol. 2, No. 1, Jan./Feb. 1998.

"Sharing computers on a Linux (or heterogeneous) network, Part 1". www-106.ibm.com/developerworks/library/1-share1.html.

"Remote Control for Everybody: VNC Crosses Networks and Platforms" http://networkingworking.earthweb.com/netos/article.php/1470341.

"Sharing computers on a Linux (or heterogeneous) network, Part 2", http://www=106.ibm.com/developerworks/linux/library/1-share2/.

"Global Teleporting with Java: Toward Ubiquitous Personalized Computing", IEEE, Feb. 1997, pp. 53-59.

"Mobile GUI On the Web", Daniel Dardailler, Fall 1994, Web Conference in Boston, pp. 1-14.

* cited by examiner

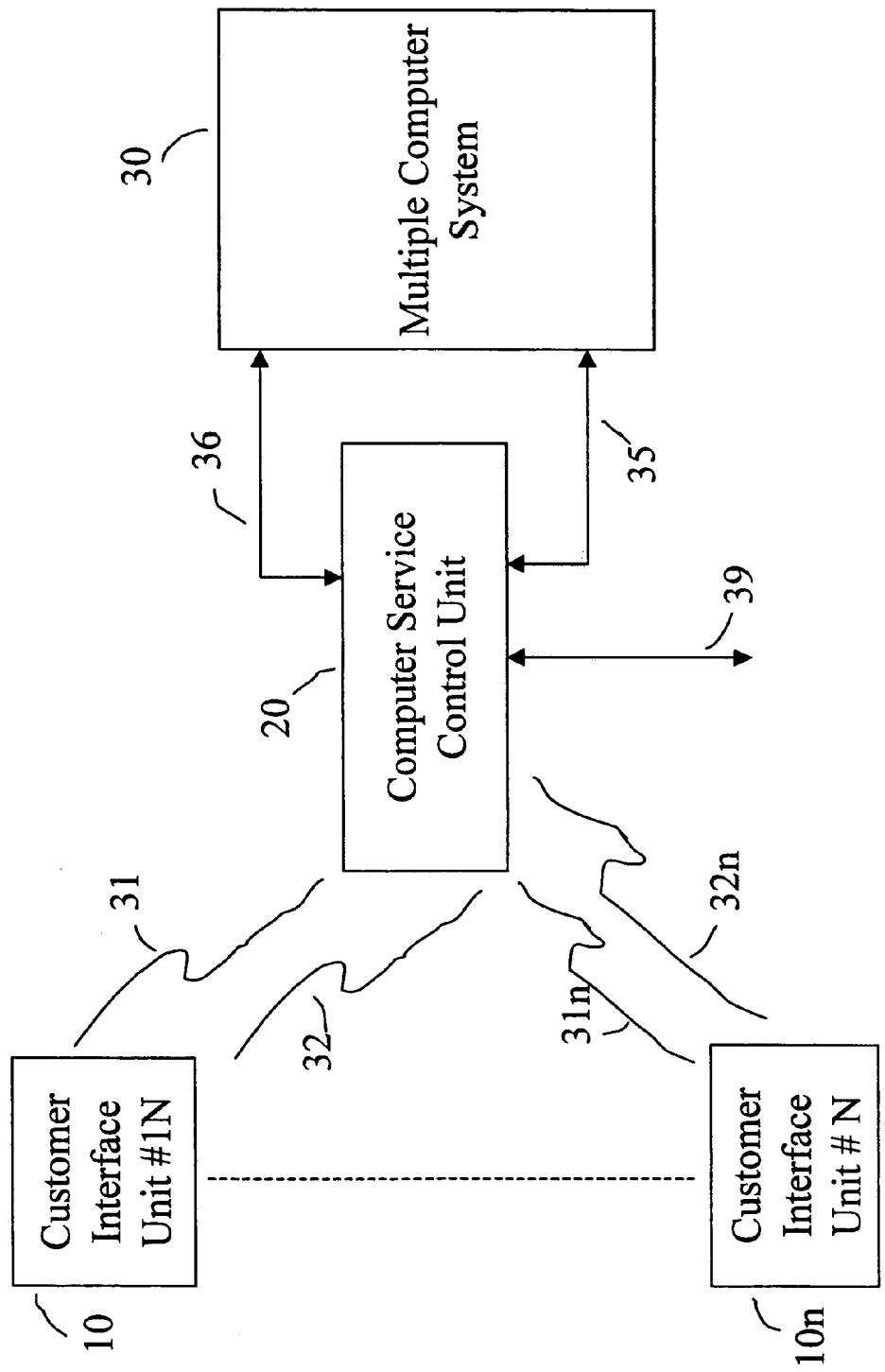
Figure 1 A Multiple Customer Computer Service System

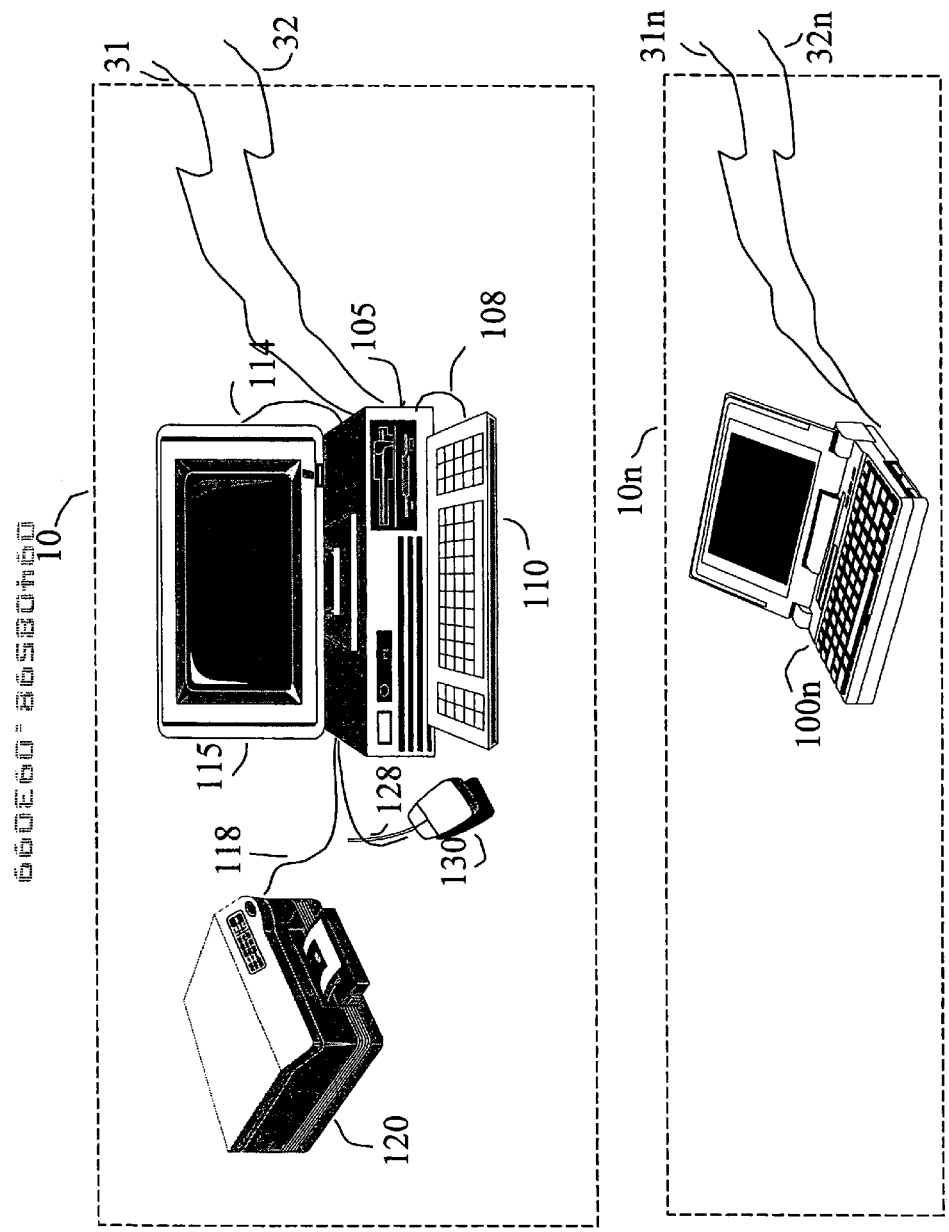
Figure 2 Computer User Interface Units

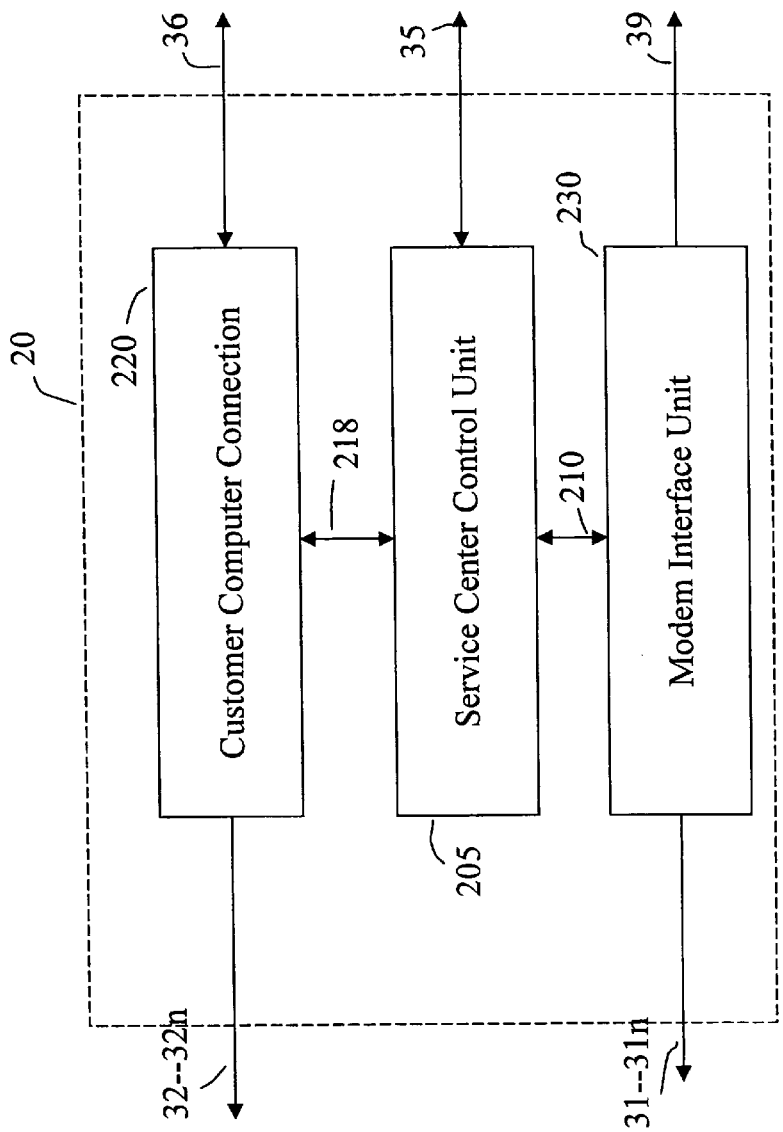
Figure 3 Computer Service Control Unit

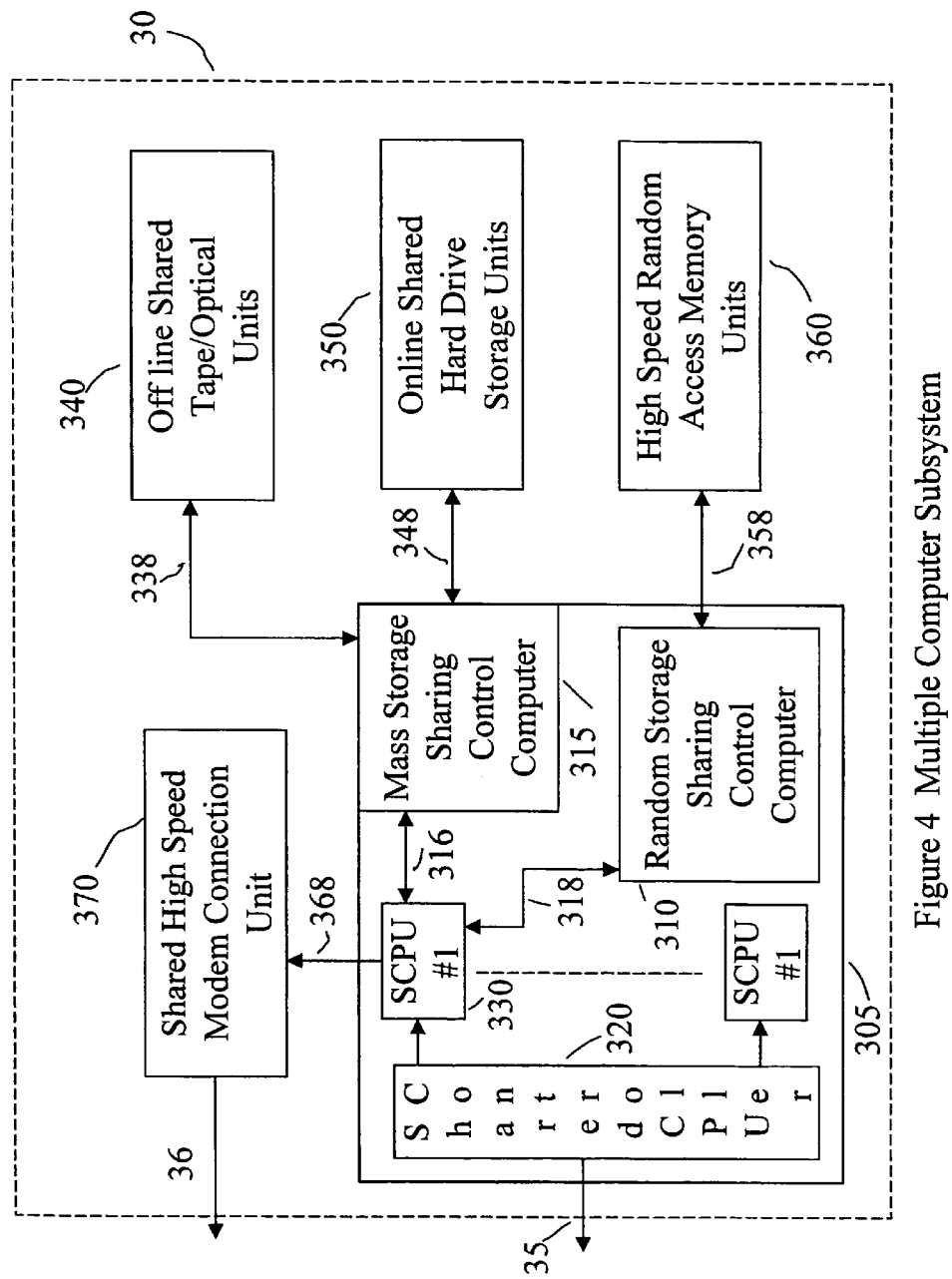
Figure 4 Multiple Computer Subsystem

| Computer Interface Unit Functions | Customer Service Center Unit | Multiple Service Center |
|---|---|---|
| • Down load customers log on menu to the current CIU<br>• Down load the customers last configuration compatible with the log on CIU used for the current log on and notify the customer of any differences that they will encounter if the current CIU is different than the last CIU | • controls the modems 220<br>• Maintains logs and passwords of customers along with the billing and payment records | • Software to manage shared off line storage server elements<br>• Software to manage shared on line Hard drive server elements<br>• Software to manage shared on line random memory server elements |
| • Insure that up link modem can handle System communication requirements (e.g. 56K or better) prior to log on<br>• Insure that down link modem can handle system requirements prior to log on (e.g.128K or better) | • Can allow a customer to connect to a remote computer using predetermined connection software and share the modem server used for MSC connected customers | • Software to manage shared on line high speed modem server elements<br>• Software to manage shared on line CPU server elements<br>• Software to manage unique customer database and application elements<br>• Software to manage unique customer configuration elements |

Figure 5 System Major Software Functions

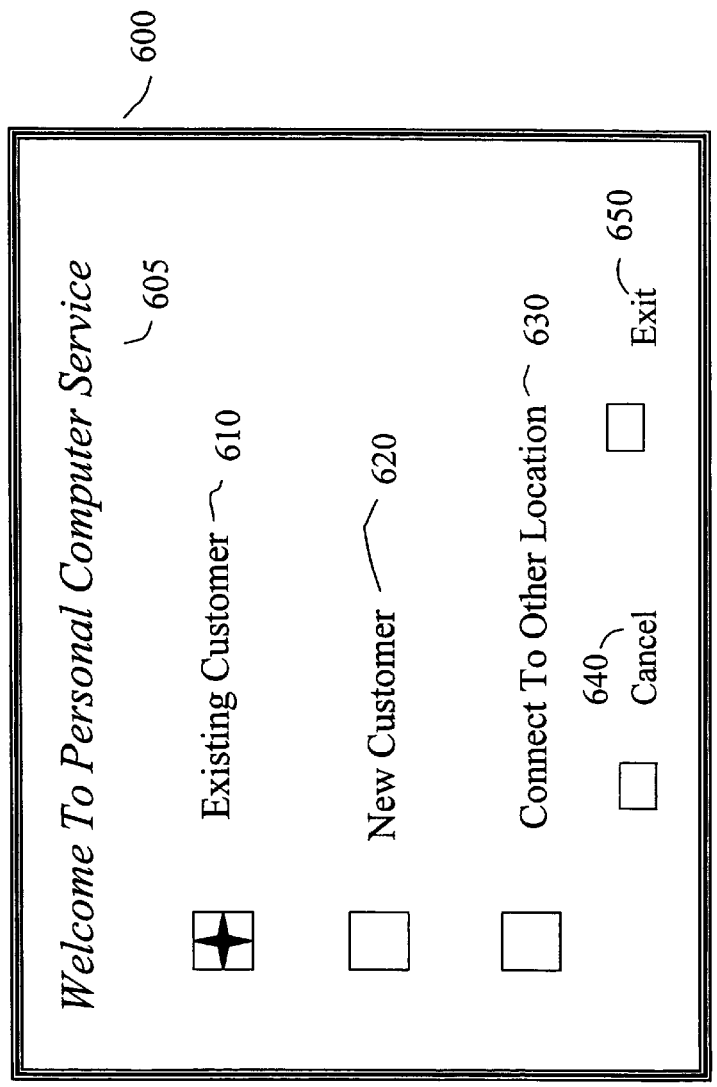
Figure 6 Customers Interface Unit Log on Menu

MULTIPLE CUSTOMER AND MULTIPLE LOCATION PC SERVICE PROVIDER SYSTEM

CROSS-REFERENCE TO RELATED APPLICATIONS

The present patent application is a continuation in part of U.S. Ser. No. 09/014,859, filed on Jan. 29, 1998, now U.S. Pat. No. 6,243,743. The present patent application also claims priority to the provisional patent application identified by U.S. Ser. No. 60/102,618, which was filed on Oct. 1, 1998, the entire content of which is hereby incorporated herein by reference.

BACKGROUND OF THE INVENTION

Currently, and in the past, an individual's personal computer (PC) could only be accessed via a network using specialized software such as PC Anywhere, Windows dial up networking, or a client server system which has a limited number of station locations. This requires very specialized software at both locations along with periodic maintenance at both locations. The worst part of this situation is that each individual is responsible for upgrading, both his hardware and software. The PC obsolescence rate is approximately every eighteen months and is not expected to change in the next twenty years. Both of these problems make using a personal computer very time consuming (low productivity) and location restrictive (inconvenient) at best.

The two current basic solutions to these PC problems revolve around (a) the portable computer and (b) the attempt to expand and simplify client/server systems.

The portable computer industry has grown rapidly to try and eliminate the location restrictions, but portable PC machines suffer from the same obsolescence problems along with another major inconvenience. That of having to carry a computer when traveling and batteries etc.

The solution by the so called "thin client" PC networks is to connect inexpensive PC's (referred to as thin clients) to a company network so employees do not have to maintain as many files at their locations. Such approaches are practical for the work place where many files are shared, but not for the individual's Personal Computer where no files are shared.

SUMMARY OF THE INVENTION

The present invention is a multi-customer computer service system that solves the existing obsolescence and inconvenience problems in a different manner. The present invention relates generally to a system designed to provide an unlimited number of individuals to be connected to a PC computer service provider simultaneously using a variety of existing predetermined customer interface units such as existing PC's running on DOS, OS2, Win95/98, MacOS, NT OS, and the new "Multi-Mode Multifunction Information Management Systems" as they incorporate the PC into single housings being shared by many multiple machines. The individual can be connected from any location (office, home, a friends house, a hotel and from any foreign country), and have their PC GUI (Graphical User Interface) down loaded and appear just as it was, the last time the individual signed off on that particular type of machine. In addition all of the individuals' database and files are decoded and made available just as if they were stored on a PC located at the individual's current log in location. In essence, the current invention combines server methods in use today with advances in microprocessor technology to design a server system that can provide the individual their own PC upon demand from virtually any location without the maintenance and update headaches of today's PC's.

The present invention is a multi-customer computer system, which can be implemented by a service provider such as AOL, MSN, or even a communications company such as World Comm, Inc. A system, such as the one described in this invention would shift the awful burden of keeping ones PC current in both software and hardware (2 year upgrades) to a service provider, and at the same time, free the customer from location restrictions. Also, the service provider can inform the computer user of software updates and new applications, which can be provided as part of the service for a small fee. Even more important the individual does not have to take the new software updates unless they wish (not the case with existing network systems that supply software upgrades). The service provider can maintain many versions of the same software because of the huge economy of scale involved. To see the economic impact of the present invention the following examples are provided.

Current average customer cost to keep hardware updated is $750.00 per year (not including printers and storage devices), but including customers' time to update. Current average customer cost to keep software updated is $250.00 per year counting new applications and customers' time. Thus, the average computer user will spend $1,000.00 per year to keep updated (Worldwide, this represents $800 billion dollars per year in just hardware, software, maintenance and upgrade sales for the personal computer industry in today's market.)

In the system described, a service provider such as AOL, could charge $20.00 a month (they currently charge $20 a month for e-mail and Internet services) for PC service, and pay for the system described in three years plus pay for operational costs and make a profit. This would amount to an annual saving of 75% to the individual. In addition, the number of computer users would quickly rise and offset, to a large degree, the drop in industry hardware and software manufacturing requirements. The requirements are much lower because the current invention allows the service provider to only pay royalty fees when the software is in use (Shannon's Law). The hardware sales requirements would also be reduced because of the same Shannon's law. The service provider for example, can share PC engines (CPU's), software (both operating system and application), fast memory (RAM), permanent memory (Hard Drives) with a number of customers and move permanent storage to Tape/CD units until a customer logs back onto the system and needs their personal database on line. These types of tremendous Shannon Law savings in resource cost, including the sharing of technicians and PC real estate will yield a much more orderly expansion of the PC industry in the future.

Thus, the system described in this invention provides the means to bring both the convenience and affordability to all persons wanting the advantage of personal computers and would shift the present customer burden of PC upgrades to the service industry. At present, the computer companies such as Compaq, Intel, Microsoft, Sun Micro Systems and Cisco are addressing the obsolescence, convenience and cost problems mentioned above, by lowering the hardware cost through continued developments and using the emerging Web/TV system to eliminate the need for displays at home. However, these are variations on the same old industry approach to progress in which the customer still is left with the annual obsolescence and daily location convenience problems of his personal computer. Until eliminated or substantially reduced, the problems mentioned will keep many people from ever trying to become computer literate than otherwise might be the case.

The invention described in this Patent, really opens up the possibility for major changes in education, and would allow every child with a TV (Web/TV) to have a computer. This could be at school, at home, or any place else (friend's house, hotel, foreign country, etc.) the child happened to need access. Once the "Rent a PC" system described in this invention is implemented it will allow the Internet service providers to expand and provide personal computers to their customers along with the many other services they are providing today. The companies that are successful in implementing the system described in this invention will probably end up giving each customer their home customer interface unit as a part of the monthly service charge, just as cable companies do now to connect their customers to selected cable TV channels. A candidate for such a home/office machine is the Multi-mode Multifunction Information Management System (MIMS) described in a co-pending patent application submitted by the author. The system described in this invention is only practical because of the recent technical advances listed below, or the small number of operating systems and application programs required and most of all because the service provider industry wants customers.

1) CPU speeds rapidly approaching 1 GHZ
2) Solid State memory size and cost reductions near $0.1/MB
3) Hard Drive capacity, speed and size reduction near $0.01/MB
4) The Internet & communication/software infrastructure
5) Modem speed, number of lines, and line bandwidth increases
6) Less than ten PC OS used in roughly 95% of PC's
7) Less than 50 PC application programs service 90% of the users
8) The new Service Provider industry needs customers and new services That is, it would not have been practical to consider a true PC worldwide server system in the past because the technological infrastructure was not available, the delivery of information was very expensive, and the computer Service Provider Industry never developed beyond small niche database or accounting services.

BRIEF DESCRIPTION OF THE SEVERAL VIEWS OF THE DRAWINGS

FIG. 1 is a diagrammatic view of the multi-customer computer service system of the present invention.

FIG. 2 is a view of two basic sub elements, which would typically be associated with the customer interface units shown in FIG. 1.

FIG. 3 is a view of the Computer Service Control Unit, shown in FIG. 1.

FIG. 4 is a view of the Computer Service Provider multiple computer sub system shown in FIG. 1.

FIG. 5 is a function diagram for software required of the system in FIG. 1.

FIG. 6 is a typical start up computer interface menu.

DESCRIPTION OF THE PREFERRED EMBODIMENT

The term "multi customer" as used herein means that a large but unspecified number of customers are serviced by the multi customer computer service system described herein. An example of the preferred embodiment would be an Internet service provider operating much like a phone or cable company, in which a large number of customers can be connected from a large number of different locations to a large number of PC's, at a specific location.

Shown in FIG. 1 is a multi customer computer service system (MCCSS) 5 which is constructed in accordance with the present invention. In general, the MCCSS 5 of FIG. 1 has at least one (1) computer service control unit CSCU 20, connected to at least two (2) customer interface units (CIU 10 and 10*n*) via at least one (1) modem connection 31, and possibly two modem connections 31, 32 depending on the speed (bandwidth) of the individual modems. In general, the CSCU 20 is constructed to interrogate each new CIU 10 connection via a browser for example and receive a request for service from the customer interface unit (CIU) 10 via line 31 in which the interrogation response contains information about the customers Interface Unit CIU 10. The CSCU 20 could be a stand_alone PC Service provider with connections to the Internet, company intranets, the regular phone system and maintain it's own Multiple Computer Systems ("MCS") unit 30 or have connections to other service provider systems that have been approved by the owner of the MCS 30 such as AOL that has multiple tier connections around the world to be the customer service control unit CSCU 20. The preferred embodiment is for many Internet service providers and large companies to maintain their own CSCU 20 along with their own MCS 30 in order to simplify having to hand off the actual PC service once the customer has logged onto the service.

Once the customer CIU 10 is connected to the CSCU 20, the customer information is either a new customer service information, or is simply an old customer already assigned a personal identification number (PIN) asking to be connected to their personal computer located within the service centers multiple computer systems (MCS) 30, via line 35, or to one of the customer's computers located at another location via line 39 (see FIG. 2). In response to the CIU 10 requesting the multiple computer systems (MCS) 30 computer service, the CSCU 20 either establishes a new customer account, or connects the CIU 10 to the MCS 30 via line 36 when an encrypted valid PIN is received. The MCS 30 first downloads a program to the CIU 10 to determine the CIU 10 configuration and possibly, a more sophisticated browser, for example, than that used in the original automatic interrogation when the CIU 10 was first connected to the CSCU 20. The down loaded program evaluates the CIU 10 in a manner similar to that used by software installation programs such as that used by PC anywhere to determine the computer system configuration or most any new software program that needs to know all of the basic information about the CIU 10 regarding modem type and speed, printer type, browser type and version. The preferred embodiment of this downloaded program is that used by all operating systems set up programs used to determine the target computer configuration modified to determine additional factors such as modem speed, and display capability in order to determine if the existing CIU 10 connection is one of the predetermined configurations acceptable by the MCS 30 unit. This is required since the customer is free to use any predetermined CIU 10 configuration located any place in the world at anytime. The only requirements for a CIU 10 unit is to be recognized by the MCS 30 is that it have a predetermined number of communication, customer interface elements to be discussed in more detail in connection with FIG. 2. Once the MCS 30 establishes the configuration of the CIU 10, the MCS 30 down loads the customer's personal computer information file (PCIF) to the CIU 10, which causes the CIU 10 display to appear as the last time the customer used their computer before being stored in the MCS 30 at shut down. The CIU 10 display is modified only by changes caused by the difference in the last CIU 10 unit used by the customer, and the one currently being used to access their PC.

This feature, of being able to call up one's own personal computer (just like a person left it the last time used) from anywhere in the world, using any PC or Web/TV is what makes the system so significant. In fact, once the Personal Computer Industry is converted to a service industry, individuals will be able to use their computers almost any time or any place. Public CIU 10 terminals in airports, malls, and hotels will be as common as public phone booths are today, and at about the same cost (i.e. CIU 10's will be the phones of tomorrow).

If the customer requested the CSCU 20 to connect them to their (or anybody else in which they had the phone number or authorization code if required) computer at home, office, etc., the connection would be made via line 39 and in these cases the initial information displayed at the CIU 10 would be that provided by the "special" computer requested by the customer. This would, in essence, bypass the use of the customer's PC stored in the MCS 30 unit. For many years this will certainly happen often, since many customers will still want their own "personal" system at home and/or office in addition to a service provider PC. That is, it is anticipated that the PC service computer described herein will initially be used in addition to the customer's home or office PC and will be used to extend the obsolescence period of existing PC systems. As customers convert over to the advanced computers and software available with service center PC's, to maintain anything other than displays, keyboards, mouse, printer and fax at home will more than likely decrease. To connect the customer to special PC's at locations other than that of the MCS 30, the CSCU 20 would either, provide the software to connect the CIU 10 with the required special computer via line 39, or just allow the modem connection 39 connected to 32 to be made and allow the CIU 10 to perform the required communication without intervention from the CSCU 20 (e.g. operate just like PC anywhere software was loaded on both the CIU 10 machine and the special PC machine).

The CIU 10 is further described in connection with FIG. 2 where unit 10 and unit 10-n are shown to depict that the MCSS 5 can work with multiple type CIU 10 units, for the sake of clarity only the more complicated CIU 10 unit 10 will be described. Whenever the customer has a display unit 115 such as a Packard Bell model 1412 SL connected via line 114 to a Computer Service Center Interface, and local control unit 105, (which could be a PC unit such as a Packard Bell platinum pro 650), which has an internal modem connected to line 31 and keyboard 110 connected via line 108 and mouse unit 130 connected via line 128, connected to a printer unit 120 such as an HP model 820c via line 118 then such a configuration is for example qualified and an appropriate CIU 10 predetermined CIU file is placed in the configuration files of the MCS 30 memory unit and the MCS 30 matches this file with the information provided to the MCS 30 when the customer logs into the service provider to use their PC from that same location or same type configuration at a different location. The CIU 10 just described could be located at the customer's home, office, friend's house, hotel, mall, or airport in any city or country. The customer for example could log onto an internet service provider and could click the mouse arrow on the computer service icon (not shown in FIG. 2) for example and the computer service icon screen would appear and give the customer several options to select from. As a minimum the options available to the customer are a) new customer, b) service computer and c) other computers. If the new customer (option a) is selected the next menu collects the necessary information to identify the new customer (name, address, phone, etc.) plus payment information. Upon completing the new customer form the data is submitted to the CSCU 20 via line 31 and upon acceptance by the CSCU 20 a personal Identification Number (PIN) is given to the new customer to use in the future. In addition, new customers are asked what personal computer application software they would like to have available (e.g., Word Perfect, D base IV, Lotus, Excel, etc.) and if they would like to up load any of their specialized programs and data bases into their new MCS 30 PC systems memory. This would allow them to have access to their existing PC data and programs plus software they do not have loaded on their own computer. If the service computer (b) option is selected the menu which appears, asks for the customer pin. Upon providing the PIN a connection by the CSCU 20 unit is made to the MCS 30 via line 35. A disconnection is made, if a valid pin number can not be established between the CIU 10 and CSCU 20, after a certain number of attempts.

In connection with FIG. 3, the CSCU 20 is further described to have a modem interface unit (MIU) 230 which controls all of the modems of the CSCU 20 (this might be 10 to 200 thousand) which, connects to line 31 connected to the CIU 10. The MIU 230 is connected to the service center control unit (SCCU) 205 via line 210, which has all of the controls and software required to maintain the customer data base with PIN numbers and is responsible for monitoring the payments of each customer to keep their PIN valid or make invalid if payments are not received. This would also be the unit that maintained administrative and the account close out software and would be the way customers were notified that payments were not received, or when new software was available, and other such information and promotional messages could be provided by the service provider. Such messages would be given each time the customer was connected with a valid PIN or the customer could choose to not have any promotional materials provided such as done automatically by most ISP's today. The SCCU 205, also activates the customers service center PC by giving the MCS 30 via line 35 the customers pin. At this point, the MCS 30 takes over and the MIU 230 connection is transferred to the customer computer connection (CCC) 220 if required by the SCCU 205 via line 218. This transfer between the MIU 230 to the CCC 220 is done in the software in order to hand off administration tasks to the MSC 30 controller unit 370 and unload the SCCU 205 unit. The time of connection is noted by a multi shared computer connection unit MSCCU 305 shown in FIG. 4 which is an element of the MCS 30 unit and which is comprised of a shared CPU control unit (SCPUCU) 320 which controls the sharing of the available shared central processor units SCPUS 330 connected via 328.

The SCPU 330 are in turn connected to the mass storage sharing control computer (MSSCC) 315 via line 316 and to the random storage sharing control computer (RSSCC) 310 via line 318. The MSCCU 305 is also connected to the shared high speed modem connection unit 370 via line 368, which in turn is connected back to the CIU 10 via line 36 to unit customer computer connection 220 and line 32. Note that in the cases where line 31 has all of the required band width, there is no requirement for lines 32 and 36 or shared high-speed modem connection unit 370 and customer computer connection (CCC) 220. However, they are included in the preferred embodiment because at the present time PC modems are running between 28 KBS and 10 MBS. As a practical matter, the modem speed needs to be greater than 128 KBS for good performance. By the time service centers are in operation the average modem speed probably will be greater than the 128 KBS. Also, when cable modems are used in downloading (Web/TV systems) line 32 can represent the high-speed cable modem and the line 31 can represent the slower speed up link or phone modem connection. Consequently, for clarity purposes, the up link will refer to modem connection 31 and the down-link to lines 36 and modem connection 32 to denote that plenty of band width is available to communicate between the customers CIU 10 and service centers multi shared computer connection unit MSCCU 305. Communication switches such as the Cisco series IGX 8400 or more advanced BPX 8600 series switches will handle the required speeds for both the IP connected service providers and the company intranets plus the legacy phone connections.

The MSSCC 315 is connected to an on line shared hard drive unit (SHDU) 350 such as a raid 1 system from Adaptec to insure reliable backed up on line operation via line 348 and an off line shared Tape/CD ROM unit (STU) 340 via line 338 such as an Alpha Systems model 2000 or Brothers International unit with back up for each customer set of files. The backed up offline customer data system is maintained as if the system was storing a hard drive for each customer and the data is secured using a Public Key Infrastructure (PKI) type system such as those available from IBM, Cybertrust or GTE. It is assumed through out this description that the data integrity is maintained from input to the CSCU 20 unit to the output back to the CIU 10 unit via PKI system that is incorporated into and made a part of the customers PIN, or other suitable encryption system. When a customer first logs on to the CSCU 20 the MCS 30 transfers the customers data base from the STU 340 to the SHDU 350 via lines 338 and 348, controlled by the MSSCC 315. Also the MSCCU 305 via the SCPUCU 320 selects one of the SCPUs 330 to serve this request (note that depending on the speed of the SCPUs 330 up to 10 customers might be serviced (time shared) by the same SCPU 330). Also, the SCPU 330 selected for the customer asks an RSSCC 310 memory computer for the customer requested computing tasks in the shared high speed random access memory unit (RAMU) 360, via line 358. After selection of the SCPU 330 and transferring the customers data base and programs menu from the off line shared tape/CD ROM unit 340 to the on line shared hard drive unit 350 and after allocating enough RAM in the high speed random access memory unit 360 the required elements of the customer's PC is in essence, assembled.

This assembled group of elements will then operate the customers dedicated PC, and be connected directly to the customer's CIU 10 via modem connections 31 and 32 until all of the customers screen requests are completed. This completion indication can be caused by a) inactivity for a pre-selected number of minutes, b) the CIU 10 unit is turned off or c) the customer indicates completion by shutting down the computer, for example, with a click of the "finished" icon. Once the customer's CIU 10 is disconnected the SCPU 330 selected, causes the last know configuration information regarding all of the PC files to be stored in the off line storage system 340 in a manner for example similar to that commonly done by two major PC operating systems (Microsoft windows and the Apple computer operating systems) modified to treat the customer data in and encrypted manner. Thus, the customer's last known PC configuration is ready to be reloaded the next time the CSCU 20 is contacted.

Referring to FIG. 5, the functional steps that are required by the invention's software is depicted. Except for the MSCCU 305 each of the software functions described in FIG. 5, can be accomplished by using visual basic 5 development software by persons skilled in the art or any of the other server software consistent with the controllers being used in RSSCC 310, SCPUCU 320, and MSSCC 315. These functions would preferably be done in such a manner that a menu 600 presented to the customer when first making a connection would look something like that shown in FIG. 6. For example, the menu 600 may be provided with a heading 605, and choices for the customer to select, such as an existing customer choice 610, a new customer choice 620, a connect to other location choice 630, a cancel choice 640 or an exit choice 650. Once the customer makes a selection then the software provided to perform the remaining functions controls the CIU 10 screen.

The most sophisticated piece of software is that associated with managing the MCS 30 units, and MSCCU unit 305. The software associated with this part of the system is available from Client/server developers, such as Sun Micro Systems, Microsoft, Cisco and IBM. These software systems manage large number of enterprise computer networks to connect computers (up to 20,000) located through out the world for large corporations to inter company resources referred to as INTRANETS. With small modifications, known to those skilled in the art, this multi services management software can be used for managing up to several million PC customer hard drives PC configurations and several thousand sets of PC hardware subsystem elements along with PC customer private databases from one location. In fact, the problem becomes easier at one location because communication delays associated with large INTRANETS which span the globe connecting PC's have the individual communication delays which must be considered. These delays are virtually eliminated with the service provider approach because the PC's (i.e. the SCPUs 330) are all at one location. Only the "finished" information needs to be sent to the Customer after the computational or data lookup process is completed by the PC (SCPU 330) at the service center (i.e. MCS 30). The system message server and modem server software can easily handle this part of the overall service task. The process is similar in concept to the old (and current) mainframe computers that could be accessed from Dumb Terminals and their processor and memory shared with several individuals simultaneously. However those systems never even attempted to maintain specialized, terminal, database, and application configurations for separate customers in order to be able to reproduce an individuals computer in the configuration it was last used. Client/Server systems such as Microsoft's NT5 latest version try to provide all of the services that they envision (i.e. remote access servers, databases servers, E-mail servers, modem servers, printer servers, application servers, Internet servers, etc) the individual might need except for the individuals PC itself. The current invention does not preclude the individual from using these other type client/server systems. In fact, it makes it much easier to access shared database and E-mail services located at the same location as the PC rather than a company trying to build their own global network for such services. That is, homes and companies would only need a single Multi-Mode Multifunction Information Management System(MIMS) machine (i.e. CIU 10 units that have phone, E-mail, paging, fax, copy, printing, typing, scanning, display, keyboard, mouse, disk storage, USB ports for other digital machines such as cameras, in a single housing unit), having essentially the same footprint as workstation computers have today. Such a MIMS CIU 10 is described in a co-pending application submitted by the author of this invention.

Also, worry about data security, would be much less of a problem in the current invention for the following reasons. (a) The number of individuals with physical access to the individuals databases would be greatly reduced. (b) The encryption power would be significantly greater than today because the speed of the PC CPU would be 2 to 3 times faster and password codes could be much longer such as data, finger and voice prints all being required to generate an access password.

In summary the PC hardware/software server system described to build a service provider PC rental system or to replace an existing client/server and/or mainframe server networks is much more efficient. By way of example, a one gigabyte 64 bit bus system could allow one PC CPU to service 1000 PC customers on line simultaneously if PC/Server resource management software were adapted to manage the PC subsystem elements from the existing client/server software as suggested above. Thus 1000 PC CPU's, RAM's, and HARD DISKS configured in the hardware server manner described in this invention could service 100,000 to 1,000,000 customers simultaneously. Also, the real estate for each of the 1000 PC hardware subsystem elements (CPU's, RAM, etc) would be about 1/1000 of a normal PC unit housing all the required subsystem elements. For example the PC CPU server would probably contain 100 1 Ghz advanced Pentium class CPU's per 8" by 19" by 24" housing. Similar economies of scale would readily be achieved with RAM/Servers and Hard Drive/Server designs.

The achievable worldwide savings in storage requirements alone is astounding. Consider that current PC storage usage is typically 1000 parts for operating system/application programs for every 1 part of useful customer data storage (a conservative estimate), and that a Shannon Law gain of one thousand is achieved with the Hard Disk PC/Server system described in this invention. Then only one millionth of the number of hard drives in existence would be needed to service the current number of PC customers. Such changes in the PC industry future are of great benefit to the individual when both PC cost and personal time are considered.

Changes may be made in the construction and operation of the various elements described herein or in the steps or sequence of steps of the methods described herein without departing from the spirit and scope of the invention as defined in the following claims.

What is claimed is:

1. A method for providing a service for remotely controlling a remote computer unit using an interface unit, the remote computer unit comprising a personal computer, the method comprising the steps of:
    operating a website capable of allowing and facilitating communication between a remote computer unit and an interface unit via an internet;
    receiving, by the website, a valid logon command from the interface unit whereby the website associates the valid logon command with the remote computer unit;
    receiving, by the website, data signal instructions from the interface unit; and
    sending the data signal instructions from the website to the remote computer unit whereby the data signal instructions act to remotely operate the remote computer unit as if the operator of the interface unit were sitting in front of the remote computer unit and actually operating the remote computer unit.

2. The method of claim 1, further comprising the step of installing a program onto the remote computer unit to permit the data signal instructions sent by the website originating from the interface unit to further facilitate the ability of the interface unit to remotely operate the remote computer unit through the website as if the operator of the interface unit were sitting in front of the remote computer unit and actually operating the remote computer unit.

3. The method of claim 2, further comprising the steps of billing for access to the service and monitoring payments made by the customer to maintain the customer's access to the service.

4. The method of claim 1, further comprising the steps of billing for access to the service and monitoring payments made by the customer to maintain the customer's access to the service.

5. The method of claim 1, further comprising the step of downloading a program from the website to the remote computer unit prior to the step of sending the data signal instructions from the website to the remote computer unit, the program downloaded onto the remote computer unit establishing the remote computer unit to be controlled by the data signal instructions.

* * * * *

(12) EX PARTE REEXAMINATION CERTIFICATE (6908th)
United States Patent
Freeny, Jr.

(10) Number: US 6,999,945 C1
(45) Certificate Issued: *Jun. 30, 2009

(54) MULTIPLE CUSTOMER AND MULTIPLE LOCATION PC SERVICE PROVIDER SYSTEM

(75) Inventor: Charles C. Freeny, Jr., Grand Prairie, TX (US)

(73) Assignee: Automated Business Companies, Irving, TX (US)

Reexamination Request:
No. 90/008,122, Jul. 25, 2006
No. 90/008,287, Oct. 6, 2006
No. 90/008,288, Oct. 6, 2006
No. 90/008,286, Oct. 6, 2006

Reexamination Certificate for:
Patent No.: 6,999,945
Issued: Feb. 14, 2006
Appl. No.: 09/408,598
Filed: Sep. 30, 1999

(*) Notice: This patent is subject to a terminal disclaimer.

Related U.S. Application Data

(63) Continuation-in-part of application No. 09/014,859, filed on Jan. 29, 1998, now Pat. No. 6,243,743.
(60) Provisional application No. 60/102,618, filed on Oct. 1, 1998.

(51) Int. Cl.
G06F 15/16 (2006.01)

(52) U.S. Cl. .............................. 705/50; 705/1; 709/204; 709/217; 709/250
(58) Field of Classification Search .................. None
See application file for complete search history.

(56) References Cited

U.S. PATENT DOCUMENTS

| 3,363,234 | A | 1/1968 | Erickson et al. |
|---|---|---|---|
| 4,351,025 | A | 9/1982 | Hall, Jr. |
| 4,396,984 | A | 8/1983 | Videki, II |
| 4,495,570 | A | 1/1985 | Kitajima et al. |
| 4,589,068 | A | 5/1986 | Heinen, Jr. |
| 4,652,990 | A | 3/1987 | Pailen et al. |
| 4,939,509 | A | 7/1990 | Bartholomew et al. |
| 4,949,257 | A | 8/1990 | Orbach |
| 4,999,771 | A | 3/1991 | Ralph et al. |
| 5,047,928 | A | 9/1991 | Wiedemer |
| 5,051,822 | A | 9/1991 | Rhoades |
| 5,062,059 | A | 10/1991 | Youngblood et al. |

(Continued)

OTHER PUBLICATIONS

PCAnywhere 32 v 7.5 User's Guide (1996).*
Lotus Development Corp., "Lotus Continues Domino Momentum with Aggressive Pricing for Electronic Commerce Solution", PR Newswire: Dec. 11, 1996, available at http://www.highbeam.com/library/doc3.asp?DOCID=1G1:18936950&num=2&ctrlInfo=Round19%3AProd%ASR%3ASR%Aresult&ao=&FreePremium=BOTH.

(Continued)

*Primary Examiner*—Charles Craver

(57) ABSTRACT

The present invention contemplates a system whereby a service provider can service a large number of customers (millions) and connect them to their rented PC from millions of locations around the world. Many customers (10 to 100 thousand) can be connected simultaneously. The service provider is responsible for maintaining the latest PC Hardware and Software configurations available on the market instead of the customer. The rented PC operates in essentially the same manner as if one purchased and maintained their PC at home or office. Access to the individuals rented PC can be obtained from any existing PC, office network computer, a Web TV computer or other customer interface computer which has been authorized by the service provider. The current invention will greatly improve existing Client/Server systems being used to service large global offices. However The greatest improvement, is to make the PC much more convenient and easier for the individual to use in the future and shift the PC hardware and software update burden to the service provider.

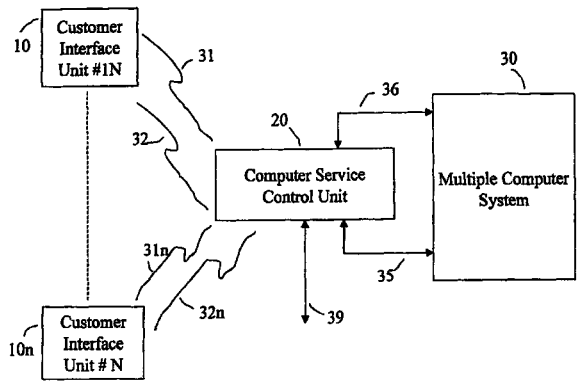

A Multiple Customer Computer Service System

U.S. PATENT DOCUMENTS

| | | | |
|---|---|---|---|
| 5,115,499 A | | 5/1992 | Stiffler et al. |
| 5,142,624 A | | 8/1992 | Patrick, II |
| 5,157,769 A | | 10/1992 | Eppley et al. |
| 5,206,934 A | | 4/1993 | Naef, III |
| 5,208,912 A | | 5/1993 | Nakayama et al. |
| 5,241,594 A | | 8/1993 | Kung |
| 5,249,290 A | | 9/1993 | Heizer |
| 5,263,165 A | | 11/1993 | Janis |
| 5,283,861 A | | 2/1994 | Dangler et al. |
| 5,287,461 A | | 2/1994 | Moore |
| 5,293,619 A | | 3/1994 | Dean |
| 5,349,675 A | | 9/1994 | Fitzgerald et al. |
| 5,355,365 A | | 10/1994 | Bhat et al. |
| 5,388,211 A | | 2/1995 | Hornbuckle |
| 5,392,400 A | | 2/1995 | Berkowitz et al. |
| 5,396,546 A | | 3/1995 | Remillard |
| 5,410,543 A | | 4/1995 | Seitz et al. |
| 5,421,009 A | | 5/1995 | Platt |
| 5,426,427 A | | 6/1995 | Chinnock et al. |
| 5,485,370 A | | 1/1996 | Moss et al. |
| 5,497,479 A | | 3/1996 | Hornbuckle |
| 5,522,070 A | | 5/1996 | Sumimoto |
| 5,537,548 A | | 7/1996 | Fin et al. |
| 5,544,320 A | * | 8/1996 | Konrad ................. 709/203 |
| 5,548,645 A | | 8/1996 | Ananda |
| 5,564,043 A | | 10/1996 | Siefert |
| 5,577,251 A | | 11/1996 | Hamilton et al. |
| 5,581,390 A | | 12/1996 | Fielden et al. |
| 5,583,997 A | | 12/1996 | Hart |
| 5,590,199 A | | 12/1996 | Krajewski, Jr. et al. |
| 5,598,536 A | | 1/1997 | Slaughter et al. |
| 5,613,089 A | | 3/1997 | Hornbuckle |
| 5,649,187 A | | 7/1997 | Hornbuckle |
| 5,664,778 A | | 9/1997 | Kikuchi et al. |
| 5,666,501 A | | 9/1997 | Jones et al. |
| 5,692,126 A | | 11/1997 | Templeton et al. |
| 5,726,912 A | | 3/1998 | Krall, Jr. et al. |
| 5,745,556 A | | 4/1998 | Ronen |
| 5,758,072 A | | 5/1998 | Filepp et al. |
| 5,758,074 A | | 5/1998 | Marlin et al. |
| 5,764,639 A | | 6/1998 | Staples et al. |
| 5,771,354 A | | 6/1998 | Crawford |
| 5,781,909 A | | 7/1998 | Logan et al. |
| 5,802,299 A | | 9/1998 | Logan et al. |
| 5,805,806 A | | 9/1998 | McArthur |
| 5,857,074 A | * | 1/1999 | Johnson ................. 709/217 |
| 5,862,339 A | | 1/1999 | Bonnaure et al. |
| 5,889,935 A | | 3/1999 | Ofek et al. |
| 5,901,228 A | | 5/1999 | Crawford |
| 5,925,103 A | | 7/1999 | Magallanes et al. |
| 5,928,329 A | | 7/1999 | Clark et al. |
| 5,930,258 A | | 7/1999 | Dato Solis et al. |
| 5,956,697 A | | 9/1999 | Usui |
| 5,982,363 A | | 11/1999 | Naiff |
| 5,982,392 A | | 11/1999 | Anfossi et al. |
| 5,984,783 A | | 11/1999 | Kikuchi et al. |
| 5,991,799 A | | 11/1999 | Yen et al. |
| 6,081,508 A | | 6/2000 | West et al. |
| 6,085,228 A | | 7/2000 | Tharakan |
| 6,137,473 A | * | 10/2000 | Cortopassi et al. ......... 345/156 |
| 6,161,137 A | | 12/2000 | Ogdon et al. |
| 6,175,854 B1 | | 1/2001 | Bretscher |
| 6,209,025 B1 | | 3/2001 | Bellamy |
| 6,219,695 B1 | * | 4/2001 | Guttag et al. ............. 709/217 |
| 6,233,604 B1 | | 5/2001 | Van Horne et al. |
| 6,233,608 B1 | | 5/2001 | Laursen et al. |
| 6,233,634 B1 | * | 5/2001 | Clark et al. ................ 710/313 |
| 6,243,743 B1 | | 6/2001 | Freeny |
| 6,263,363 B1 | | 7/2001 | Rosenblatt et al. |
| 6,275,851 B1 | | 8/2001 | Cromer et al. |
| 6,317,797 B2 | | 11/2001 | Clark et al. |
| 6,331,855 B1 | | 12/2001 | Schauser |
| 6,334,147 B1 | | 12/2001 | Cromer et al. |
| 6,343,311 B1 | | 1/2002 | Nishida et al. |
| 6,360,253 B1 | | 3/2002 | Freeny |
| 6,370,582 B1 | | 4/2002 | Lim et al. |
| 6,393,380 B1 | | 5/2002 | Zemlo |
| 6,397,245 B1 | | 5/2002 | Johnson, III et al. |
| 6,487,590 B1 | | 11/2002 | Foley et al. |
| 6,529,938 B1 | | 3/2003 | Cochran et al. |
| 6,671,813 B2 | | 12/2003 | Ananda |
| 6,680,730 B1 | | 1/2004 | Shields et al. |
| 6,725,250 B1 | | 4/2004 | Ellis, III |
| 6,999,945 B1 | | 2/2006 | Freeny, Jr. |
| 7,007,070 B1 | * | 2/2006 | Hickman ................. 709/208 |
| 7,010,577 B1 | | 3/2006 | Philyaw et al. |
| 7,016,943 B2 | | 3/2006 | Freeny |
| 7,043,536 B1 | | 5/2006 | Philyaw et al. |
| 7,099,924 B1 | | 8/2006 | Henniger et al. |
| 2001/0011308 A1 | | 8/2001 | Clark et al. |
| 2002/0144271 A1 | | 10/2002 | Behagen et al. |
| 2003/0055870 A1 | | 3/2003 | Smethers |

OTHER PUBLICATIONS

Lotus Development Corp., "Domino.Merchant Transforms a Web Site Into a Powerful Selling Engine", PR Newswire: Nov. 18, 1996, available at http://www.highbeam.com/library/doc3.asp?DOCID=1G1:18866222&num=1&ctrlInfo=Round19%3AProd%3ASR%3AResult&ao=&FreePremium=BOTH.

Lotus Development Corp., "Lotus and Business Partners Create Standard Platform for Developing and Hosting Rentable Applications", PR Newswire: Jun. 17, 1997, available at http://www.highbeam.com/library/doc3.asp?DOCID=1G1:19514076&num=23&ctrlInfo=Round19%3AProd%3ASR%3AResult&ao–32 &FreePremium=BOTH.

"Lotus and NETCOM Form Strategic Relationship to Develop and Deploy Domino–Based Applications", PR Newswire: May 10, 2006, available at http://www.highbeam.com/library/doc3.asp?DOCID=1G1:18767197&num=2&ctrlinfo=round19%3AProd%3ASR%3AResult&ao=&FreePremium=BOTH.

Schwartz, Jeffrey, "Lotus Domino Effect—ISPs Can Rent Websites Via Company's New Software", CommunicationsWeek: Oct. 21, 1996, available at http://www.highbeam.com/library/doc3.asp?DOCID=1P1:28486756&num=5&ctrlInfo=Round19%3AProd%3ASR%3AResult&ao=&FreePremium=BOTH.

Robinson, Phillip, "San Jose Mercury News, Calif., Phillip Robinson Column. (Originated from San Jose Mercury News, Calif.)", Knight Ridder/Tribune Business: Apr. 30, 1995, available at http://www.highbeam.com/library/doc3.asp?DOCID=1G1:16900178&num=1&ctrlInfo=Round19%3AProd%3ASR%3AResult&ao=1&FreePremium=BOTH.

Leibs, Scott, "Software For Rent—Internet providers hope renting will bring them closer to customers", InformationWeek: Oct. 31, 2006, available at http://www.Informationweek.com/683/83iurnt.htm.

Wainewright, Phil, "Interliant Site Offers Instant Online Rental", ASPnews.com: Sep. 23, 1998, available at http://www.aspnews.com/news/product_launches/article.php/373001.

Steiner, Jennifer G. et al., "Network Services in the Athena Environment", Project Athena, Massachusetts Institute of Technology: Jul. 21, 1988, pp. 1–10.

DePasquale, Ellen, "Remote Control Software: Extending the Boundaries of Your Office", Making Connections: Sep. 1996, vol. 4 Issue 9, available at http://www.smartcomputing.com/editorial/article.asp?article=articles/archive/2pcb/2pcb35/2pcb35.asp&guide=.

Schurman, Kyle, "Be Two Places at Once with Remote Computing", Working At Home: Jul. 1996—vol. 7, Issue 7, available at http://www.smartcomputing.com/editorial/article.asp?article=articles/1996/jul96/96n0744/96n0744.asp&articleid=1225&guid=F253EE4E6CCC4970BD09FA81D4457B95.

Hardy, Norman, "The Origins of Tymnet", Roots of Tymer, May 30, 2006 pp. 1–3 available at http://www.cap–lore.com/Tymnet/ETH.html.

Wikipedia, "Tymnet", available at http://en.wikipedia.org/wiki/Tymnet.

Hyperdictionary, "Tymnet", available at http://www.hyperdictionary.com/search.aspx?define=tymnet.

Cox, John, "Web Creates New Challenge for Client/Server Applications", Network World: Apr. 7, 1997.

Earley, J., "Remote LAN access", IEEE Xplore, The Home as an Office, IEE Colloquium: p. 1 abstract, Feb. 29, 1996.

Earley, J., "Remote LAN access", IEEE Xplore, The Home as an Office, IEE Colloquium: pp. 1–16, Feb. 29, 1996.

Patz, Joel T., "Just Like Being There—Review of Six Remote Access Software Packages—Includes Product Directory—Software Review—Evaluations", Home Office Computing: May 1996.

Provided by: ProQuest Information and Learning Company, "A Remote Control Roadster and a Luxury Sedan", Network World Inc.: Jan. 23, 1995.

Watt, Peggy, "Norton Puts pcAnywhere on Server for Remote Access", Network World Inc.: Nov. 28, 1994.

Watt, Peggy, "Remote Access Products Reign in Spring Releases", Network World Inc.: pp. 1–2, May 22, 1995.

Cavanah, Cassandra, "Remote Possibilities: Not in Your Office? Remote Control Software Make it Simple to Access Your Computer", Entrepreneur Media, Inc.: pp. 1–3, Nov. 1997.

Wood, Kenneth R. et al., "Global Teleporting with Java: Toward Ubiquitous Personalized Computing", IEEE: pp. 53–59, 1997.

Halfhill, Tom, "Cheaper Computing, Part I", BYTE.com: pp. 1–8, Apr. 1997 available at http://www.byte.com/art/9704/sec6/art1.htm#047csa2.

Comerford, Richard, "The Battle for the Desktop", IEEE Spectrum: pp. 21–28, May 1997.

Bockenski, Barbara, "Developers Need Network Know–How; Communication Integral to Architecture—Client/Server 101—Includes a Related Article Listing 10 Important Networking Features—Column", Wiesner Publications, Inc.: pp. 1–2, Sep. 15, 1993 available at http://www.findarticles.com/p/articles/mi_mOSMG/is_n14_v13/al_14426054?lstpn=search_sampler&lstpc=search&lstpr=internal&lstprs=looksmart&lstwid=1&lstwn=search_results&lstwp=body_middle.

Storm, David, "Novell Connect Analysis", David Storm Inc.: pp. 1–3, 1993 available at http:www.strom.com/pubwork/nw93.html.

Schauer, Hervé, et al., "An Internet Gatekeeper", Symposium Proceedings, UNIX Security III, Baltimore, MD, Sep. 14–16, 1992, pp. 49–61.

Thompson, J. David, et al., "A Secure Public Network Access Mechanism", Symposium Proceedings, UNIX Security III, Baltimore, MD, Sep. 14–16, 1992, pp. 227–238.

Baldwin, Bob, et al., "Dial–In Security Firewall Software", Symposium Proceedings, UNIX Security IV, Santa Clara, California, Oct. 4–6, 1993, pp. 59–62.

Kahn, Brian L., "Safe Use of X Window System Protocol Across a Firewall", The Fifth USENIX UNIX Security Symposium, Jun. 5–7, 1995, pp. 105–116.

Wong, Alexander Ya–li, et al., "Evaluating Windows NT Terminal Server Performance", Proceedings of the $3^{rd}$ USENIX Windows NT Symposium, Seattle, Washington, Jul. 12–13, 1999.

York, Kyle, "Building a DOS Serial Network", Dr. Dobb's Journal, May 1996, pp. 38–43, p. 80.

Rubinstein, Charles B., et al., "Corporate Networking Applications", AT&T Technical Journal, Sep./Oct. 1991, pp. 27–35.

Oseka, Juliet, "Remote Control Software", Working at Home, Jul. 1995, vol. 6, Issue 7.

Murphy, Gwen, "Breakthrough New Software Allows Individuals to Open Personal Web Offices", Press Release, Netopia, Inc., Alameda, California, Dec. 9, 1996.

Murphy, Gwen, "Farallon Reports Fiscal First Quarter 1997 Results", Press Release, Netopia, Inc., Alameda, California, Jan. 23, 1997.

"Netopia™ Virtual Office Reviewer's Guide", pp. 1–12, Undated.

"Netopia™ Virtual Office Reference Guide", p. 4, Undated.

Murphy, Gwen, "Farallon Upgrades Netopia Virtual Office for Windows NT 4.0 and 3.51", Press Release, Netopia, Inc., Alameda, California, Jun. 23, 1997.

"Technote Index", Netopia Central Hardware and Software Technote Index, http://web.archive.org/web/19980223233024/www.netopia.com/support/technotes, Retrieved on Aug. 24, 2006.

"Netopia Virtual Office 1.1", Netopia Virtual Office Support Index, http://web.archive.org/web/19980223223947/www.netopia.com/support/technotes/software, Retrieved on Aug. 24, 2006.

"FAQ—Netopia Virtual Office", Netopia: FAQ—Netopia Virtual Office, http://web.archive.org/web/19980223223857/www.netopia.com/support/faqs/software/nvo..., Retrieved on Aug. 24, 2006.

"NVO_001: Internet Addressing and DNS Servers", Technical Notes: Internet Addressing with NVO, http://web.archive.org/web/19980223235426/www.netopia.com/support/technotes/software..., Retrieved on Aug. 24, 2006.

"NVO_002: Free Web Address", Technical Notes: NVO Free Web Address, http://web.archive.org/web/19980223235435/www.netopia.com/support/technotes/software..., Retrieved on Aug. 24, 2006.

"NVO_003: Plug–Ins and ActiveX Controls", Technical Notes: NVO Plugins, http://web.arvhive.org/web/19980223235442/www.netopia.com/support/technotes/software..., Retrieved on Aug. 24, 2006.

"NVO_004: Security", Technical Notes: NVO Security, http://web.archive.org/web/19980223235448/www.netopia.com/support/technotes/software..., Retrieved on Aug. 24, 2006.

"NVO_005: Modifying Netopia Virtual Office Pages", Technical Notes: Modifying NVO, http://web.archive.org/web/19980223235455/www.netopia.com/support/technotes/software..., Retrieved on Aug. 24, 2006.

Kleinberg, Bennett, et al., Netopia and GeoCities Release Netopia Virtual Office 2, Press Release, Alameda and Santa Monica, California, http://web.archive.org/web/19980223223537/www.netopia.com/corp/press/98_1_12.html Jan. 12, 1998.

"Netopia Virtual Office 2.0 Release Notes", Netopia Virtual Office 2.0 Release Notes, http://web.archive.org/web/19980127062259/www.netopia.com/support/technotes/software.nvo..., Retrieved on Aug. 21, 2006.

Netopia Press Releases, http://web.archive.org/web/19980223233010/www.netopia.com/corp/press, Retrieved on Aug. 24, 2006.

"Frequently Asked Questions", Netopia Virtual Office FAQs, http://web.archive.org/web/19980127051737/http://netopia.com/software/nvo/win/faq.html, Retrieved on Aug. 21, 2006.

Netopia Virtual Office Help Guide, pp. 1–33 (Undated).

"Netopia Virtual Office", Netopia Virtual Office—Maximiz your web presence with Netopia Virtual Office, http://web.archive.org/web/19980223230156/www.netopia.com/software/nvo/, Retrieved on Aug. 24, 2006.

"More Info About Netopia Virtual Office", Netopia Virtual Office—More Info, http://web.archive.org/web/19980223224744/www.netopia.com/software/nvo/more_info.h..., Retrieved on Aug. 24, 2006.

"Netopia Virtual Office Overview", Netopia Virtual Office Overview Page, http://web.archive.org/web/19980224000001/www.netopia.com/software/nvo/win/overview..., Retrieved on Aug. 24, 2006.

"Netopia Virtual Office", Netopia Virtual Office Screenshots–in–Basket, http://web.archive.org/web/19980224004013/www.netopia.com/software/nvo/win/in_basket... Retrieved on Aug. 24, 2006.

"Netopia Virtual Office—Out Basket", Netopia Virtual Office Screenshots—Out Basket, http://web.archive.org/web/19980224004019/www.netopia.com/software.nvo/win/out_basket.. Retrieved on Aug. 24, 2006.

"Netopia Virtual Office—Conference Room", Netopia Virtual Office Screenshots—Conference Room, http://web.archive.org/web/19980224004025/www.netopia.com/software/nvo/win/conference..., Retrieved on Aug. 24, 2006.

"Netopia Virtual Office—Screensharing", Netopia Virtual Office Screenshots: Look and Control, http://web.archive.org/web/19980224004034/www.netopia.com/software/nvo/win/look_an..., Retrieved on Aug. 24, 2006.

"Netopia Virtual Office—Conference Room: Intercom", Netopia Virtual Office Screenshots—Chat, http://web.archive.org/web/19980224004040/www.netopia.com/software/nvo/win/chat.html, Retrieved on Aug. 24, 2006.

"Netopia Virtual Office—Pictures", Netopia Virtual Office Screenshots—Gallery, http://web.archive.org/web/19980224004055/www.netopia.com/software/nvo/win/gallery..., Retrieved on Aug. 24, 2006.

"Netopia Virtual Office—Ironclad Security", Netopia Virtual Office Screenshots—Security, http://web.archive.org/web/19980224002544/www.netopia.com/software/nvo/win/security..., Retrieved on Aug. 24, 2006.

"Netopia Virtual Office—Setup", Netopia Virtual Office Screenshots—Setup, http://web.archive.org/web/19980223232629/www.netopia.com/software/nvo/win/setup.html, Retrieved on Aug. 24, 2006.

"Netopia Virtual Office—Office Door", Netopia Virtual Office Screenshots—Office Door, http://web.archive.org/web/19980224000209/www.netopia.com/software/nvo/win/office_d..., Retrieved on Aug. 24, 2006.

"Netopia Virtual Office—Business Card", Netopia Virtual Office Screenshots—Business Card, http://web.archive.org/web/19980224004101/www.netopia.com/software/nvo/win/business..., Retrieved on Aug. 24, 2006.

"Customization of the Citrix ICA Web Client", Citrix Systems, Inc., Citrix Consulting Services, pp. 1–9 (Undated.)

"LapLink Gold 11.0", http://reviews.cnet.com/LapLink_Gold, Retrieved on Aug. 22, 2006.

"Lotus Announces Instant! Teamroom Rentable Collaborative Application", New York, Jun. 17, 1997, http://72.14.207.104/search?q=cache:BTBC3wQmh_EJ:www.findwealth.com/lotus–announces–instantteamroom–rentable–collaborative–14561pr.html.

Gajeway, Charles H., "Just Like Being There—Review of Eight Remote Control Programs—Includes Vendor Directory and Purchasing 'Cheat Sheet'—Software Review—Evaluation", Home Office Computing: May 1997.

"Symantec pcAnywhere™ Administrator's Guide", Chapter 4 (2004).

"Managing Security in Symantec pcAnywhere™", Chapter 6 (Undated).

"The Evolution of the Win 32 ICA Clients", Citrix (Undated).

"Symantec Ships pcANYWHERE32 v 7.5 for Windows 95 and Windows NT", Symantec Corporation, Jun. 18, 1996.

"Symantec pcANYWHERE32 v 7.5 User's Guide, cover page, copyright page and pp. 1–7,1–11, 2, 2–1, 2–2, Chapter 4, Chapter 5, Chapter 10", Symantec Corporation, Copyright 1993–1996.

PR Newswire, "Lotus Ships Domino SPA Tools to Enable Web Developers to Create 'Rentable' Applications Based on Lotus Domino", Jan. 23, 1997 ("Lotus Rentable Applications").

"Stac ReachOut 7.0 Adapts to New Paradigms" ("ReachOut"), Mike Fratto, Network Computing, Apr. 1, 1997.

"A Modular Computer Sharing System", Herbert B. Baskin, et al., Communications of the ACM (R.L. Ashenhurst, editor) (the Baskin article), vol. 12, Oct. 1969.

"The X Window System and Broadway, Accessing UNIX/X Windows Applications Over the Internet, Intranet and Enterprise Extranet"), White Paper, Hummingbird Communications, Ltd., Copyright 1996 ("Hummingbird Paper").

Scheifler, "Broadway—Universal Access to Interactive Applications Over the Web", slides presented at Xtech '96, Feb. 12–14, 1996, ("Universal Access").

Bowen, "Will Lights on Broadway Outshine Java", SunWorld, Feb. 1996 ("Broadway").

Dossick, et al., "Distributed Tool Services Via the World Wide Web", Oct. 1, 1996.

Croes, "Enterprise–strength Remote Access", Network World, Jul. 15, 1996.

Edwards, "Connecting Users in the Outer Network—Remote Access Options", Communications News, Jun. 1997.

Strothman, "Want to View Your Plant's Operations? Surf Your Internet", InTech, Oct. 1997.

"Lotus to Develop New Class of Collaborative Internet Applications Designed for Rental by Web Users", Oct. 15, 1996.

O'Shea, "Apps for Rent: Rentable Applications Give ISPs a Way to Play the Good Host", Telephony Online, Sep. 7, 1998.

Valigra, "The Intranet Takes a Call", Client Server Computing, Sep. 1996.

Farallon Communications, Inc., Netopia Virtual Office, Version 1.0, "Getting Started with Netopia Virtual Office Windows version", Copyright 1997 v.0297 ("Virtual Office Guide").

Farallon Communications, Inc., Press Release, "Farallon's Netopia Virtual Office Software Now Generally Available for Individuals to Open Personal Web Offices", Mar. 3, 1997 ("Virtual Office PR").

Farallon Communications, Inc., Netopia Timbuktu Pro for Macintosh, Version 3.0 "User's Guide Macintosh Edition", Copyright 1996 v.896 ("Timbuktu User's Guide").

Farallon Communications, Inc., Press Release "Farallon Redefines Macintosh Remote Access and Internet Collaboration", Sep. 3, 1996 ("Timbuktu PR").

Netopia, Inc. (f.k.a. Farallon Communications, Inc.), Press Release, "Netopia and GeoCities Announce Joint Venture to Enhance User Productivity on the Internet", Dec. 2, 1997 ("Hosted Virtual Office").

Farallon Communications, Inc., Netopia Virtual Office Release Notes, Mar. 1997 ("Netopia Virtual Office Release Notes").

Farallon Communications, Inc., "Timbuktu Pro Enterprise Security White Paper", Copyright 1997.

Doane, Amy "Enterprise Computing: Net Vendors, ISPs Raise Credibility of Rented Software", InfoWorld, Aug. 25, 1997.

Lotus Development Corp., "Domino.Merchant Transforms a Web Site Into a Powerful Selling Engine", PR Newswire: Nov. 18, 1996, availabe at http://www.highbeam.com/library/doc3.asp?DOCID=1G1:18866222&num=1&ctrlInfo=Round19%3AProd%3ASR%3AResult&ao=&FreePremium=BOTH.

Lotus Development Corp., "Lotus and Business Partners Create Standard Platform for Developing and Hosting Rentable Applications", PR Newswire: Jun. 17, 1997, available at http://www.highbeam.com/library/doc3.asp?DOCID=1G1:19514076&num=23&ctrlInfo=Round19%3AProd%3ASR%3AResult&ao=&FreePremium=BOTH.

Schwartz, Jeffrey, "Lotus Domino Effect—ISPs Can Rent Websites Via Company's New Software", CommunicationsWeek: Oct. 21, 1996, available at http://www.highbeam.com/library/doc3.asp?DOCID=1P1:28486756&num=5&ctrlInfo=Round19%3AProd%3ASR%3AResult&ao=&FreePremium=BOTH.

Robinson, Phillip, "San Jose Mercury News, Calif., Phillip Robinson Column. (Originated from San Jose Mercury News, Calif.)", Knight Ridder/Tribune Business: Apr. 30, 1995, available at http://www.highbeam.com/library/doc3.asp?DOCID=1G1:16900178&num=1&ctrolInfo=Round19%3AProd%3ASR%3AResult&ao=1&FreePremium=BOTH.

Leibs Scott, "Software For Rent—Internet providers hope renting will bring them closer to customers", InformationWeek: Oct. 31, 2006, available at http://www.informationweek.com/683/83iurnt.htm.

Wainewright, Phil, "Interliant Site Offers Instant Online Rental", ASPnews.com: Sep. 23, 1998, available at http://www.aspnews.com/news/product_launches/article.php/373001.

Steiner, Jennifer G. et al., "Network Services in the Athena Environment", Project Athena, Massachusetts Institute of Technology: Jul. 21, 1988, pp. 1–10.

DePasquale, Ellen, "Remote Control Software: Extending the Boundaries of Your Office", Making Connections: Sep. 1996, vol. 4 Issue 9, available at http://www.smartcomputing.com/editorial/article.asp?article=articles/archive/2pcb/2pcb35/2pcb35.asp&guid=.

Schurman, Kyle, "Be Two Place at Once with Remote Computing", Working At Home: Jul. 1996—vol. 7 Issue 7, available at http://www.smartcomputing.com/editorial/article.asp?article=articles/1996/jul96/96n0744/96n0744.asp&articleid=1225&guid=F253EE4E6CCC4970BD09FA81D4457B95.

Hardy, Norman, "The Origins of Tymnet", Roots of Tymer, May 30, 2006 pp. 1–3 available at http://www.cap–lore.com/Tymnet/ETH.html.

Wikipedia, "Tymnet", available at http://en.wikipedia.org/wiki/Tymnet.

Hyperdictionary, "Tymnet", available at http://www.hyperdictionary.com/search.aspx?define=tymnet.

K. R. Wood, T. Richardson, F. Bennett, A. Harter and A. Hopper, "Global Teleporting with Java: Toward Ubiquitous Personalised Computing", IEEE Computer, vol. 30, No. 2, Feb. 1997.

Cox, John, "Web Creates New Challenge for Client/Server Applications", Network World: Apr. 7, 1997.

Earley, J., "Remote LAN access", IEEE Xplore, The Home as an Office, IEE Colloquium: p. 1 abstract, Feb. 29, 1996.

Earley, J., "Remote LAN access", IEEE Xplore, The Home as an Office, IEE Colloquium: pp. 1–16, Feb. 29, 1996.

Patz, Joel T., "Just Like Being There—Review of Six Remote Access Software Packages—Includes Product Directory—Software Review—Evaluations", Home Office Computing: May 1996.

Provided by: ProQuest Information and Learning Company, "A Remote Control Roadster and a Luxury Sedan", Network World Inc.: Jan. 23, 1995.

Watt, Peggy, "Norton Puts pcAnywhere on Server for Remote Access", Network World Inc.: Nov. 28, 1994.

Watt, Peggy, "Remote Access Products Reign in Spring Releases", Network World Inc.: pp. 1–2, May 22, 1995.

Cavanah, Cassandra, "Remote Possibilities: Not in Your Office? Remote Control Software Make it Simple to Access Your Computer", Entrepreuneur Media, Inc.: pp. 1–3, Nov. 1997.

Richardson, Tristan et al., "Teleporting in an X Window System Environment: a ubiquitous, presonalized computing environment for all", IEEE Personal Communications: pp. 6–12, Third Quarter 1994.

Bennett, Frazer et al. "Teleporting—Making Applications Mobile", IEEE: pp. 82–84, 1995.

Wood, Kenneth R. et al., "Global Teleporting with Java: Toward Ubiquitous Personalized Computing", IEEE: pp. 53–59, 1997.

Richardson, Tristan et al., "Virtual Network Computing", IEEE: pp. 33–38, Jan.–Feb. 1998.

Halfhill, Tom, "Cheaper Computing, Part I", BYTE.com: pp. 1–8, Apr. 1997 available at http://www.byte.com/art/9704/sec6/art1.htm#047csa2.

Comerford, Richard, "The Battle for the Desktop", IEEE Spectrum: pp. 21–28, May 1997.

Bockenski, Barbara, "Developers Need Network Know–How; Communication Integral to Architecture—Client/Server 101—Includes a Related Article Listing 10 Important Networking Features—Column", Wiesner Publications, Inc.: pp. 1–2, Sep. 15, 1993 available at http://www.findarticles.com/p/articles/mi_m0SMG/is_n14_v13/ai_14426054?lstpn=search_sampler&lstpc=search&lstpr=internal&lstprs=looksmart&lstwid=1&lstwn=search_results&lstwp=body_middle.

Storm, David, "Novell Connect Analysis", David Storm Inc.: pp. 1–3, 1993 available at http:www.strom.com/pub-work/nw93.html.

Schauer, Hervé, et al., "An Internet Gatekeeper", Symposium Proceedings, UNIX Security III, Baltimore, MD, Sep. 14–16, 1992, pp. 49–61.

Thompson, J. David, et al., "A Secure Public Network Access Mechanism", Symposium Proceedings, UNIX Security III, Baltimore, MD, Sep. 14–16, 1992, pp. 227–238.

Baldwin, Bob, et al., "Dial–In Security Firewall Software", Symposium Proceedings, UNIX Security IV, Santa Clara, California, Oct. 4–6, 1993, pp. 59–62.

Kahn, Brian L., "Safe Use of X Window System Protocol Across a Firewall", The Fifth USENIX UNIX Security Symposium, Jun. 5–7, 1995, pp. 105–116.

Wong, Alexander Ya–Ii, et al., "Evaluating Windows NT Terminal Server Performance", Proceedings of the $3_{rd}$ USENIX Windows NT Symposium, Seattle, Washington, Jul. 12–13, 1999.

York, Kyle, "Building a DOS Serial Network", Dr. Dobb's Journal, May 1996, pp. 38–43, p. 80.

Rubinstein, Charles B., et al., "Corporate Networking Applications", AT&T Technical Journal, Sep./Oct. 1991, pp. 27–35.

Oseka, Juliet, "Remote Control Software", Working at Home, Jul. 1995, vol. 6, Issue 7.

Murphy, Gwen, "Breakthrough New Software Allows Individuals to Open Personal Web Offices", Press Release, Netopia, Inc., Alameda, California, Dec. 9, 1996.

Murphy, Gwen, "Farallon Reports Fiscal First Quarter 1997 Results", Press Release, Netopia, Inc., Alameda, California, Jan. 23, 1997.

"Netopia™ Virtual Office Reviewer's Guide", pp. 1–12, Undated.

"Netopia™ Virtual Office Reference Guide", p. 4, Undated.

Murphy, Gwen, "Farallon Upgrades Netopia Virtual Office for Windows NT 4.0 and 3.51", Press Release, Netopia, Inc., Alameda, California, Jun. 23, 1997.

"Technote Index", Netopia Central Hardware and Software Technote Index, http://web.archive.org/web/19980223233024/www.netopia.com/support/technotes, Retrieved on Aug. 24, 2006.

"Netopia Virtual Office 1.1", Netopia Virtual Office Support Index, http://web.archive.org/web/19980223223947/www.netopia.com/support/technotes/software, Retrieved on Aug. 24, 2006.

"FAQ—Netopia Virtual Office", Netopia: FAQ—Netopia Virtual Office, http://web.archive.org/web/19980223223857/www.netopia.com/support/faqs/software/nvo..., Retrieved on Aug. 24, 2006.

"NVO_001: Internet Addressing and DNS Servers", Technical Notes: Internet Addressing with NVO, http://web.archive.org/web/19980223235426/www. netopia.com/support/technotes/software..., Retrieved on Aug. 24, 2006.

"NVO_002: Free Web Address", Technical Notes: NVO Free Web Address, http://web.archive.org/web/19980223235435/www.netopia.com/support/technotes/software..., Retrieved on Aug. 24, 2006.

"NVO_003: Plug–ins and ActiveX Controls", Technical Notes: NVO Plugins, http://web.arvhive.org/web/19980223235442/www.netopia.com/support/technotes/software..., Retrieved on Aug. 24, 2006.

"NVO_004: Security", Technical Notes: NVO Security, http://web.archive.org/web/19980223235448/www.netopia.com/support/technotes/software..., Retrieved on Aug. 24, 2006.

"NVO_005: Modifying Netopia Virtual Office Pages", Technical Notes: Modifying NVO, http://web.archive.org/web/19980223235455/www.netopia.com/support/technotes/software..., Retrieved on Aug. 24, 2006.

Kleinberg, Bennett, et al., Netopia and GeoCities Release Netopia Virtual Office 2, Press Release, Alameda and Santa Monica, California, http://web.archive.org/web/19980223223537/www.netopia.com/corp/press/98_1_12.html Jan. 12, 1998.

"Netopia Virtual Office 2.0 Release Notes", Netopia Virtual Office 2.0 Release Notes, http://web.archive.org/web/19980127062259/www.netopia.com/support/technotes/software.nvo..., Retrieved on Aug. 21, 2006.

Netopia Press Release, http://web.archive.org/web/19980223233010/www.netopia.com/corp/press, Retrieved on Aug. 24, 2006.

"Frequently Asked Questions", Netopia Virtual Office FAQs, http://web.archive.org/web/19980127051737/http://netopia.com/software/nvo/win/faq.html, Retrieved on Aug. 21, 2006.

Netopia Virtual Office Help Guide, pp. 1–33 (Undated).

"Netopia Virtual Office", Netopia Virtual Office—Index, http://web.archive.org/web/19980223230156/www.netopia.com/software/nvo/, Retrieved on Aug. 24, 2006.

"More Info About Netopia Virtual Office", Netopia Virtual Office—More Info, http://web.archive.org/web/19980223224744/www.netopia.com/software/nvo/more_info.h..., Retrieved on Aug. 24, 2006.

"Netopia Virtual Office Overview", Netopia Virtual Office Overview Page, http://web.archive.org/web/19980224000001/www.netopia.com/software/nvo/win/overview..., Retrieved on Aug. 24, 2006.

"Netopia Virtual Office", Netopia Virtual Office Screenshots–in–Basket, http://web.archive.org/web/19980224004013/www.netopia.com/software/nvo/win/in_basket...Retrieved on Aug. 24, 2006.

"Netopia Virtual Office—Out Basket", Netopia Virtual Office Screenshots—Out Basket, http://web.archive.org/web/19980224004019/www.netopia.com/software.nvo/win/out_basket.. Retrieved on Aug. 24, 2006.

"Netopioa Virtual Office—Conference Room", Netopia Virtual Office Screenshots—Conference Room, http://web.archive.org/web/19980224004025/www.netopia.com/software/nvo/win/conference..., Retrieved on Aug. 24, 2006.

"Netopia Virtual Office—Screensharing", Netopia Virtual Office Screenshots: Look and Control, http://web.archive.org/web/19980224004034/www.netopia.com/software/nvo/win/look_an..., Retrieved on Aug. 24, 2006.

"Netopia Virtual Office—Conference Room: Intercom", Netopia Virtual Office Screenshots—Chat, http://web.archive.org/web/19980224004040/www.netopia.com/software/nvo/win/chat.html, Retrieved on Aug. 24, 2006.

"Netopia Virtual Office—Pictures", Netopia Virtual Office Screenshots—Gallery, http://web.archive.org/web/19980224004055/www.netopia.com/software/nvo/win/gallery..., Retrieved on Aug. 24, 2006.

"Netopia Virtual Office—Ironclad Security", Netopia Virtual Office Screenshots—Security, http://web.archive.org/web/19980224002544/www.netopia.com/software/nvo/win/security..., Retrieved on Aug. 24, 2006.

"Netopia Virtual Office—Setup", Netopia Virtual Office Screenshots—Setup, http://web.archive.org/web/19980223232629/www.netopia.com/software/nvo/win/setup.html, Retrieved on Aug. 24, 2006.

"Netopia Virtual Office—Office Door", Netopia Virtual Office Screenshots—Office Door, http://web.archive.org/web/19980224000209/www.netopia.com/software/nvo/win/office_d..., Retrieved on Aug. 24, 2006.

"Netopia Virtual Office—Business Card", Netopia Virtual Office Screenshots—Business Card, http://web.archive.org/web/19980224004101/www.netopia.com/software/nvo/win/business..., Retrieved on Aug. 24, 2006.

"Customization of the Citrix ICA Web Client", Citrix Systems, Inc., Citrix Consulting Services, pp. 1–9 (Undated).

"LapLink Gold 11.0", http://reviews.cnet.com/LapLink_Gold, Retrieved on Aug. 22, 2006.

"Symantec pcAnywhere™ Administrator's Guide", Chapter 4 (2004).

"Managing Security in Symantec pcAnywhere™", Chapter 6 (Undated).

"The Evolution of the Win 32 ICA Clients", Citrix (Undated).

Edwards, "Connecting Users in the Outer Network—Remote Access Options", Communications News, Jun. 1997.

Strothman, "Want to View Your Plant's Operations? Surf Your Internet", InTech, Oct. 1997.

"Lotus to Develop New Class of Collaborative Internet Applications Designed for Rental by Web Users", Oct. 15, 1996.

O'Shea, "Apps for Rent: Rentable Applications Give ISPs a Way to Play the Good Host", Telephony Online, Sep. 7, 1998.

Valigra, "The Intranet Takes a Call", Client Server Computing, Sep. 1996.

"Symantec pcANYWHERE32 v 7.5 User's Guide, cover page, copyright page and pp. 1–7,1–11, 2, 2–1, 2–2, Chapter 4, Chapter 5, Chapter 9, Chapter 10", Symantec Corporation, Copyright 1993–1996.

"Stac ReachOut 7.0 Adapts to New Paradigms"("ReachOut"), Mike Fratto, Network Computing, Apr. 1, 1997.

"The X Windows System and Boadway, Accessing UNIX/X Windows Applications Ove the Internet, Intranet and Enterprise Extranet"), White Paper, Hummingbird Communications, Ltd., Copyright 1996 ("Hummingbird Paper").

Scheifler, "Broadway—Universal Access to Interactive Applications Over the Web", slides presented at Xtech '96, Feb. 12–14, 1996, ("Universal Access").

Bowen "Will Lights on Broadway Outshine Java", SunWorld, Feb. 1996 ("Broadway").

Dossick, et al., "Distributed Tool Services Via the World Wide Web", Oct. 1, 1996.

"A Modular Computer Sharing System", Herbert B. Baskin, et al., Communications of the ACM (R.L. Ashenhurst, editor) (the Baskin article) vol. 12, Oct. 1969.

Farallon Communications, Inc. Press Release, "Farallon's Netopia Virtual Office Software Now Generally Available for Indivudals to Open Personal Web Offices", Mar. 3, 1997 ("Virtual Office PR").

Farallon Communications, Inc., Netopia Virtual Office Release Notes, Mar. 1997 ("Netopia Virtual Office Release Notes").

Farallon Communications, Inc., Netopia Timbuktu Pro for Macintosh, Version 3.0 "User's Guide to Macintosh Edition", Copyright 1996 v.896 ("Timbuktu User's Guide").

Farallon Communications, Inc., Press Release "Farallon Redefines Macintosh Remote Access and Internet Collaboration", Sep. 3, 1996 ("Timbuktu PR").

Netopia, Inc. (f.k.a. Farallon Communications, Inc.), Press Release, "Netopia and GeoCities Announce Joint Venture to Enhance User Productivity on the Internet", Dec. 2, 1997 ("Hosted Virtual Office").

Farallon Communications, Inc., Netopia Virtual Office, Version 1.0, "Getting Started with Netopia Virtual Office Windows version", Copyright 1997 v.0297 ("Virtual Office Guide").

Croes, "Enterprise–strength Remote Access", Network World, Jul. 15, 1996.

Farallon Communications, Inc., "Timbuktu Pro Enterprise Security White Paper", Copyright 1197.

"Lotus and NETCOM Form Strategic Relationship to Develop and Deploy Domino–Based Applications", PR Newswire: May 10, 2006, available at http://www.highbeam.com/library/doc3.asp?DOCID=1G1:18767197&num=2&ctrlinfo=round19%3AProd%3ASR%3AResult&ao–32&FreePremium=BOTH.

Gajeway, Charles H., "Just Like Being There—Review of Eight Remote Control Programs—Includes Vendor Directory and Purchasing 'Cheat Sheet'—Software Review—Evaluation", Home Office Computing: May 1997.

Williams, et al. "A High–Performance Active Digital Library", Parallel Computing, V. 24 Iss. 12–13 pp. 1791–1806, Nov. 1998.

Symantec pcANYWHERE32 v. 7.5 User's Guide excerpts, 1993–1996.

"A Modular Computer Sharing System," authored by Herbert B. Baskin, Alsa B. Horowitz, Robert D. Tennison, and Larry E. Rittenhouse, which was published in Oct. 1969 in vol. 12 of Communications of the ACM (R.L. Ashenhurst editor) ("the Baskin article").

"Stac ReachOut 7.0 Adapts to New Paradigms"("ReachOut") by Mike Fratto was published in the Apr. 1, 1997 issue of Network Computing.

"Just like being there—review of eight remote control programs" ("Just Like Being There") by Charles H. Gajeway was published in Home Office Computing in May 1997.

"Enterprise Computing: Net vendors, ISPs raise credibility of rented software" ("Enterprise Computing") by Amy Doane was published in InfoWorld on Aug. 25, 1997.

"The X Windows System and Broadway, Accessing UNIX/X Windows Applications Over the Internet, Intranet and Enterprise Extranet," White Paper, Hummingbird Communications, Ltd., Copyright 1996.

Scheifler, "Broadway—Universal Access to Interactive Applications over the Web," Slides presented at XTech '96, Feb. 12–14, 1996.

Bowen "Will lights on Broadway outshine Java," SunWorld, Feb. 1996.

Farallon Communications, Inc., Netopia Virtual Office, Version 1.0, *Getting Started with Netopia Virtual Office Windows version*, Copyright 1997 v.0297 ("Virtual Office Guide").

Farallon Communications, Inc. Press Release, "Farallon's Netopia Virtual Office Software Now Generally Available for Indivuals to Open Personal Web Office," Mar. 3, 1997 ("Virtual Office PR").

Farallon Communications, Inc., Netopia Timbuktu Pro for Macintosh, Version 3.0, *User's Guide Macintosh Edition*, Copyright 1996 v.896 ("Timbuktu User's Guide").

Farallon Communications, Inc., Press Release, "Farallon Redefines Macintosh Remote Access and Internet Collaboration," Sep. 3, 1996 ("Timbuktu PR").

Netopia, Inc. (f.k.a. Farallon Communications, Inc.), Press Release, "Netopia and GeoCities Announce Joint Venture to Enhance User Productivity on the Internet," Dec. 2, 1997 ("Hosted Virtual Office").

Netopia, Inc. (f.k.a. Farallon Communications, Inc.), "Timbuktu Pro Enterprise Security White Paper," Oct. 1997 ("Security White Paper").

Symantec Corporation, "Symantec Ships pcANYWHERE32 v 7.5 for Windows 95 and Windows NT," dated Jun. 18, 1996.

Symantec Corporation, Symantec pcANYWHERE32 v 7.5 User's Guide, cover page, copyright page, and pp. 1–7, 1–11, 2–1, 2–2, Chapter 4, Chapter 5, Chapter 10, Copyright 1993–1996.

Lotus Development Corp., "Lotus Announces Instant! Teamroom Rentable Collaborative Application," dated Jun. 17, 1997.

Lotus Development Corp., "Lotus Ships Domino SPA Tools to Enable Web Developers To Create 'Rentable' Applications Based On Lotus Domino," dated Jan. 23, 1997.

Doan, Amy, "Enterprise Computing: Net vendors, ISPs raise credibility of rented software," dated Aug. 25, 1997.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3–5 is confirmed.

Claims 1 and 2 are cancelled.

\* \* \* \* \*